(12) United States Patent
Gao

(10) Patent No.: US 12,225,570 B2
(45) Date of Patent: Feb. 11, 2025

(54) UPLINK CONTROL INFORMATION TRANSMISSION METHOD AND APPARATUS, AND COMMUNICATION DEVICE

(71) Applicant: DATANG MOBILE COMMUNICATIONS EQUIPMENT CO., LTD., Beijing (CN)

(72) Inventor: Xuejuan Gao, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 411 days.

(21) Appl. No.: 17/629,787

(22) PCT Filed: Jul. 14, 2020

(86) PCT No.: PCT/CN2020/101975
§ 371 (c)(1),
(2) Date: Jan. 25, 2022

(87) PCT Pub. No.: WO2021/012997
PCT Pub. Date: Jan. 28, 2021

(65) Prior Publication Data
US 2022/0256549 A1     Aug. 11, 2022

(30) Foreign Application Priority Data

Jul. 25, 2019  (CN) .......................... 201910678686.2
Aug. 8, 2019  (CN) .......................... 201910731647.4

(51) Int. Cl.
*H04W 72/542*  (2023.01)
*H04L 1/1812*  (2023.01)
(Continued)

(52) U.S. Cl.
CPC ......... *H04W 72/542* (2023.01); *H04L 1/1812* (2013.01); *H04L 5/0053* (2013.01);
(Continued)

(58) Field of Classification Search
CPC ... H04W 72/542; H04W 72/56; H04W 72/21; H04W 72/0446; H04W 72/1263; H04L 1/1812; H04L 5/0053
(Continued)

(56) References Cited

U.S. PATENT DOCUMENTS

2010/0195629 A1*  8/2010  Chen ................... H04L 1/1664
                                                              370/336
2011/0205981 A1*  8/2011  Koo ..................... H04L 1/1671
                                                              370/329
(Continued)

FOREIGN PATENT DOCUMENTS

CN     109995485 A     7/2019
CN     110034885 A     7/2019
(Continued)

OTHER PUBLICATIONS

Ericsson,"Summary of Partially Overlapped PUCCH Resources", 3GPP TSG RAN WG1 Meeting#92bis, Sanya, China, Apr. 16-20, 2018, total 11 pages, R1-1805560.

*Primary Examiner* — Mark G. Pannell
(74) *Attorney, Agent, or Firm* — Kilpatrick Townsend & Stockton LLP

(57) ABSTRACT

The present disclosure relates to the field of communications. Disclosed are an information transmission method and apparatus, and a communication device. When a first PUCCH bearing a first UCI overlaps with, in a time domain, a plurality of second PUCCHs that do not overlap with each other in a time domain and bear HARQ-ACKs, or when the first PUCCH bearing the first UCI overlaps with the second (Continued)

---

The terminal device determines that a first PUCCH carrying first UCI overlaps, in a time domain, with each of a plurality of second PUCCHs carrying HARQ-ACKs and each of the plurality of second PUCCHs does not overlap with each other in time domain; or the terminal device determines that the first PUCCH carrying the first UCI overlaps, in the time domain, with the second PUCCH carrying a first HARQ-ACK and that a third PUCCH carrying the first HARQ-ACK and the first UCI overlaps, in the time domain, with a fourth PUCCH carrying a second HARQ-ACK  — 31

↓

The terminal device drops the first UCI — 32

PUCCHs bearing a first HARQ-ACK in a time domain, if it is determined that a third PUCCH simultaneously bearing the first HARQ-ACK and the first UCI overlaps with a fourth PUCCH bearing a second HARQ-ACK in a time domain, a terminal device discards the first UCI. By discarding the first UCI, it is possible to avoid multiplex transmission of HARQ-ACKs that do not overlap with each other in a time domain in a time slot due to the fact that the HARQ-ACKs overlap with other types of UCI to ensure effective and timely transmission of the HARQ-ACKs.

20 Claims, 14 Drawing Sheets

(51) Int. Cl.
*H04L 5/00* (2006.01)
*H04W 72/0446* (2023.01)
*H04W 72/1263* (2023.01)
*H04W 72/21* (2023.01)
*H04W 72/56* (2023.01)

(52) U.S. Cl.
CPC ... *H04W 72/0446* (2013.01); *H04W 72/1263* (2013.01); *H04W 72/21* (2023.01); *H04W 72/56* (2023.01)

(58) Field of Classification Search
USPC .......................................................... 370/329
See application file for complete search history.

(56) References Cited

U.S. PATENT DOCUMENTS

| | | | |
|---|---|---|---|
| 2011/0243066 A1* | 10/2011 | Nayeb Nazar | H04L 5/0016 370/328 |
| 2012/0220286 A1* | 8/2012 | Chen | H04W 24/10 455/422.1 |
| 2013/0083748 A1 | 4/2013 | Li | |
| 2013/0301550 A1* | 11/2013 | Kim | H04L 1/0073 370/329 |
| 2013/0308558 A1* | 11/2013 | Ye | H04W 72/02 370/329 |
| 2014/0003452 A1* | 1/2014 | Han | H04L 1/1657 370/474 |
| 2014/0293921 A1* | 10/2014 | Tang | H04W 72/21 370/329 |
| 2015/0110029 A1* | 4/2015 | Hwang | H04L 1/1671 370/329 |
| 2018/0212718 A1* | 7/2018 | Takeda | H04L 1/0031 |
| 2020/0228248 A1* | 7/2020 | Islam | H04L 1/1861 |
| 2021/0014026 A1* | 1/2021 | Papasakellariou | H04L 1/1861 |

FOREIGN PATENT DOCUMENTS

| | | |
|---|---|---|
| WO | 2019128706 A1 | 7/2019 |
| WO | 2019136706 A1 | 7/2019 |

* cited by examiner

The terminal device determines that a first PUCCH carrying first UCI overlaps, in a time domain, with each of a plurality of second PUCCHs carrying HARQ-ACKs and each of the plurality of second PUCCHs does not overlap with each other in time domain; or the terminal device determines that the first PUCCH carrying the first UCI overlaps, in the time domain, with the second PUCCH carrying a first HARQ-ACK and that a third PUCCH carrying the first HARQ-ACK and the first UCI overlaps, in the time domain, with a fourth PUCCH carrying a second HARQ-ACK ⎯ 31

The terminal device drops the first UCI ⎯ 32

Fig. 3

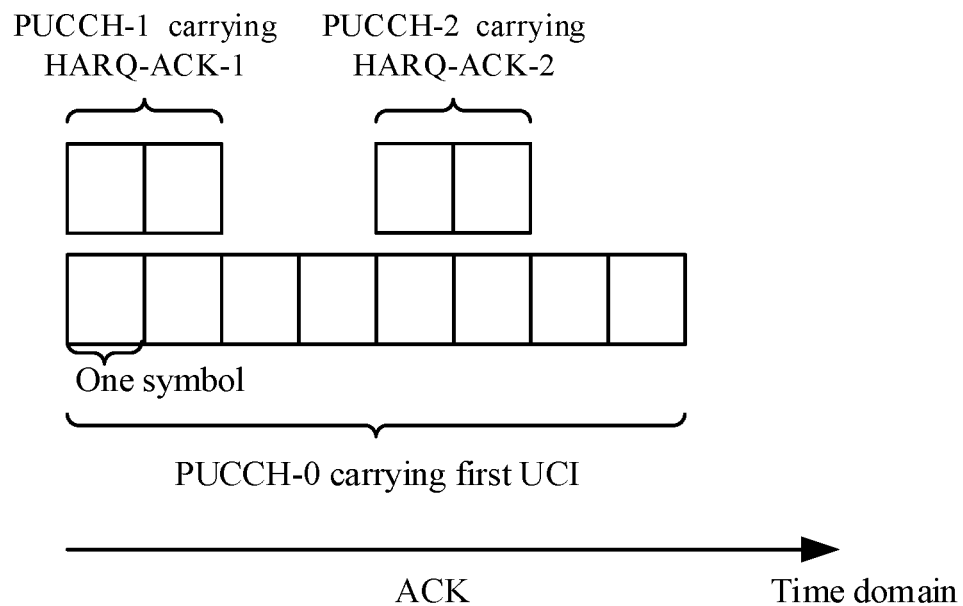

Fig. 4A

ACK

The network device determines that a first PUCCH carrying first UCI overlaps, in a time domain, with each of a plurality of second PUCCHs carrying HARQ-ACKs and not overlapping with each other in time domain; or the network device determines that a third PUCCH carrying both of the first HARQ-ACK and the first UCI overlaps, in the time domain, with a fourth PUCCH carrying the second PUCCH when the first PUCCH carrying the first UCI overlaps, in the time domain, with the second PUCCH carrying the first HARQ-ACK — 171

The network device determines that the first UCI is dropped — 172

Fig. 17

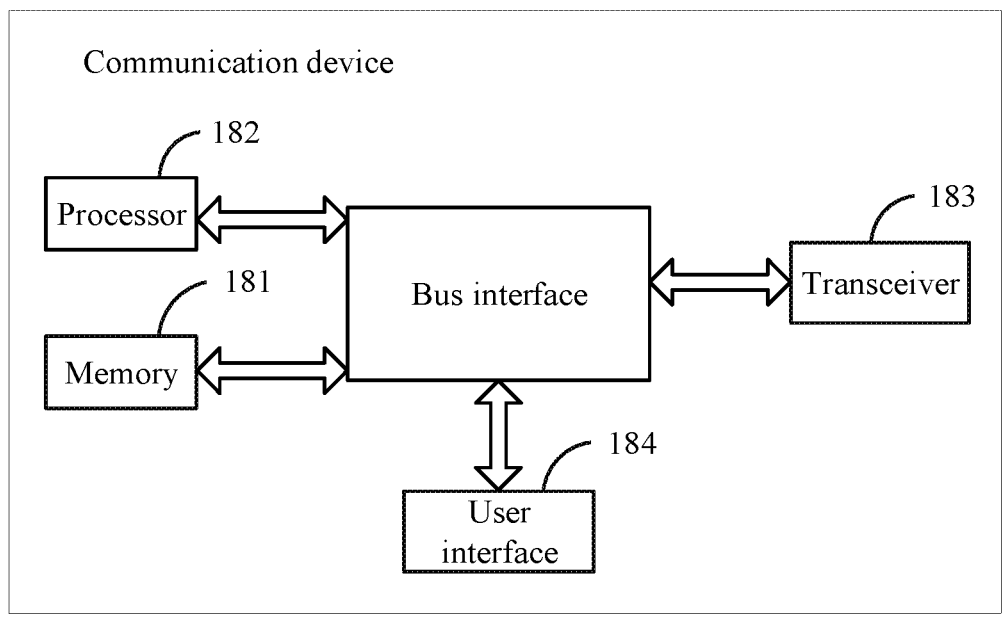

Fig. 18

UPLINK CONTROL INFORMATION TRANSMISSION METHOD AND APPARATUS, AND COMMUNICATION DEVICE

CROSS REFERENCE TO RELATED APPLICATIONS

The disclosure is a national phase entry under 35 U.S.C. § 371 of International Application No. PCT/CN2020/101975, filed on Jul. 14, 2020, which claims priority to the Chinese Patent Application No. 201910678686.2, filed to the China National Intellectual Property Administration on Jul. 25, 2019 and entitled "INFORMATION TRANSMISSION METHOD AND APPARATUS, AND COMMUNICATION DEVICE", the entire contents of which are incorporated herein by reference, and claims priority to the Chinese Patent Application No. 201910731647.4, filed to the China National Intellectual Property Administration on Aug. 8, 2019 and entitled "INFORMATION TRANSMISSION METHOD AND APPARATUS, AND COMMUNICATION DEVICE", the entire contents of which are incorporated herein by reference.

FIELD

The disclosure relates to the field of communication, in particular to an information transmission method and apparatus, and a communication device.

BACKGROUND

With development and change of demands for mobile communication services, an international telecommunication union (ITU), a 3rd generation partnership project (3GPP) and other organizations have started to study a new wireless communication system, for example, a 5th generation new radio access (5G NR) technology.

At present, in a 5G NR system, uplink control information (UCI) may use an NR physical uplink control channel (PUCCH) for transmission. NR PUCCH formats include a total of five PUCCH formats, namely, a format 0, a format 1, a format 2, a format 3 and a format 4. The PUCCH formats 0 and 1 may carry UCI of 1 to 2 bits for transmission, and the PUCCH formats 2, 3 and 4 may carry UCI of more than 2 bits for transmission.

The UCI may include a hybrid automatic repeat request-acknowledgement (HARQ-ACK), a scheduling request (SR) and periodic channel state information (CSI). The HARQ-ACK may use the PUCCH format 0 or 1 or 2 or 3 or 4 for transmission, namely, the HARQ-ACK may use any of the above mentioned five PUCCH formats for transmission. One of a set of a plurality of pre-configured PUCCH resources may be selected according to the quantity of bits of the HARQ-ACK, and each PUCCH resource corresponds to a bit quantity range, namely, a PUCCH resource of the HARQ-ACK may be selected from the set of the pre-configured PUCCH resources. The PUCCH format 0 or 1 may be used for SR transmission, and the PUCCH resource for SR transmission is configured by high-level signaling. The PUCCH format 2 or 3 or 4 may be used for CSI transmission, and the PUCCH resource for CSI transmission is configured by high-level signaling.

In 5G NR, release 15 only supports transmission of at most one PUCCH carrying the HARQ-ACK in one slot, and thus there is only one PUCCH carrying the HARQ-ACK possibly overlapping with a PUCCH carrying the SR and/or the CSI in a time domain. Release 16 supports transmission of a plurality of time division multiplexing (TDM) PUCCHs for carrying the HARQ-ACK in one slot, which causes a problem that when the plurality of PUCCHs for carrying a plurality of HARQ-ACKs in one slot overlap with the PUCCH carrying the SR and/or the CSI in the time domain, there is no specific multiplexing transmission method at present.

As can be seen, in a situation that the release 16 supports transmission of the plurality of time division multiplexing PUCCHs respectively carrying the different HARQ-ACK in one slot, the plurality of TDM PUCCHs carrying the plurality of HARQ-ACK may overlap with the PUCCH carrying the SR and/or the CSI in the time domain (for example, overlapping of at least one symbol), and there is no clear solution of how to handle with this type of overlapping transmission at present. Therefore, to solve a conflict of a plurality of PUCCH resources of the UCI in the time domain is an urgent problem to be solved at present.

SUMMARY

Embodiments of the disclosure provide an information transmission method and apparatus, and a communication device in order to solve the problem that a plurality of PUCCHs carrying a plurality of HARQ-ACKs in a slot overlap with a PUCCH carrying other types of UCI in a time domain, and to provide a multiplexing transmission solution, in the time domain, of transmission resources of the plurality of HARQ-ACKs and the other types of UCI in the slot.

On a terminal side, embodiments of the disclosure provide an information transmission method, including:
when a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACK does not overlap with each other in the time domain, dropping, by a terminal device, the first UCI;
or
when the first PUCCH carrying the first UCI overlaps, in the time domain, with a second PUCCH carrying a first HARQ-ACK, dropping, by the terminal device, the first UCI, if it is determined that a third PUCCH carrying simultaneously the first HARQ-ACK and the first UCI overlaps, in the time domain, with a fourth PUCCH carrying a second HARQ-ACK;
and the first UCI is of an type of UCI other than the HARQ-ACK, or when the first UCI includes the HARQ-ACK, a priority of the HARQ-ACK in the first UCI is lower than a priority of the HARQ-ACK carried on the second PUCCH.

By means of the method, in the slot, when a plurality of PUCCHs carrying a plurality of HARQ-ACKs which do not overlap with each other in the time domain overlap with a PUCCH of the other types of UCI (namely, the first UCI) in the time domain, a problem of overlapping of time-domain resources may be solved by dropping the first UCI, that is, multiplexing transmission needed when the HARQ-ACKs which do not overlap with each other in the time domain in the slot overlap with the other types of UCI in the time domain can be avoided, and thus effective and timely transmission of the HARQ-ACKs can be guaranteed.

In a possible implementation, the first UCI includes any one or a combination of the following: CSI or SR.

In a possible implementation, the dropping, by the terminal device, the first UCI when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, includes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping, by the terminal device, the first UCI, if it is determined that the plurality of HARQ-ACKs need to be transmitted simultaneously on the same PUCCH.

In a possible implementation, the dropping, by the terminal device, the first UCI when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, includes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping, by the terminal device, the first UCI, if it is determined that a PUCCH carrying simultaneously a first HARQ-ACK and the first UCI overlaps, in the time domain, with a PUCCH carrying a second HARQ-ACK, and the first HARQ-ACK and the second HARQ-ACK are HARQ-ACKs carried on two different second PUCCHs among the plurality of second PUCCHs.

In a possible implementation, the dropping, by the terminal device, the first UCI when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, includes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping, by the terminal device, the first UCI if a start position of the first PUCCH carrying the first UCI is earliest.

In a possible implementation, the dropping, by the terminal device, the first UCI when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, includes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping, by the terminal device, the first UCI if the first UCI is the CSI and the HARQ-ACKs carried by the plurality of second PUCCHs are HARQ-ACKs of SPS PDSCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping, by the terminal device, the first UCI if the first UCI is the CSI and the HARQ-ACKs carried by the plurality of second PUCCHs are not transmitted using any PUCCH format among PUCCH format 2 or 3 or 4.

In a possible implementation, the dropping, by the terminal device, the first UCI when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, includes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping, by the terminal device, the first UCI if the first UCI is the SR or a positive SR or the HARQ-ACK and the plurality of second PUCCHs use a PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping, by the terminal device, the first UCI if the first UCI is an HARQ-ACK with more than 2 bits and the plurality of second PUCCHs use the PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, dropping, by the terminal device, the first UCI, if it is determined that the plurality of HARQ-ACKs need to be transmitted simultaneously on the same PUCCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, dropping, by the terminal device, the first UCI, if it is determined that the PUCCH carrying both of the first HARQ-ACK and the first UCI overlaps, in the time domain, with the PUCCH carrying the second HARQ-ACK, and the first HARQ-ACK and the second HARQ-ACK are the HARQ-ACKs carried on two different second PUCCHS among the plurality of second PUCCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, dropping, by the terminal device, the first UCI if the start position of the first PUCCH carrying the first UCI is earliest.

Correspondingly, on a network side, embodiments of the disclosure provide an information transmission method, including:

when a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACK does not overlap with each other in the time domain, determining, by a network device, that the first UCI is dropped;

or when the first PUCCH carrying the first UCI overlaps, in the time domain, with a second PUCCH carrying a first HARQ-ACK, determining, by the network device, that the first UCI is dropped if it is determined that a third PUCCH carrying the first HARQ-ACK and the first UCI overlaps, in the time domain, with a fourth PUCCH carrying a second HARQ-ACK;

and the first UCI is of an type of UCI other than the HARQ-ACK, or when the first UCI includes the HARQ-ACK, a priority of the HARQ-ACK in the first UCI is lower than a priority of the HARQ-ACK carried on the second PUCCH.

Through the method, the network device at the network side can determine whether the terminal device drops the first UCI when PUCCH resources of the various UCI above mentioned (namely, the HARQ-ACK and the first UCI) overlap in the time domain, and the network device and the terminal device have consistent understanding for a processing mode of the UCI, and then effective transmission of the UCI can be guaranteed. Besides, the problem of overlapping of time-domain resources of the UCI can be solved by dropping the first UCI, and thus effective and timely transmission of the HARQ-ACK can be guaranteed.

In a possible implementation, the first UCI includes any one or a combination of the following: CSI or SR.

In a possible implementation, the determining, by the network device, that the first UCI is dropped when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, includes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining, by the network device, that the first UCI is dropped if it is determined that a plurality of HARQ-ACKs need to be transmitted simultaneously on the same PUCCH.

In a possible implementation, the determining, by the network device, that the first UCI is dropped when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, includes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining, by the network device, that the first UCI is dropped if it is determined that a PUCCH carrying both of the first HARQ-ACK and the first UCI overlaps, in the time domain, with a PUCCH carrying the second HARQ-ACK, and the first HARQ-ACK and the second HARQ-ACK are HARQ-ACKs carried on two different second PUCCHs among the plurality of second PUCCHs.

In a possible implementation, the determining, by the network device, that the first UCI is dropped when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, includes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining, by the network device, that the first UCI is dropped if a start position of the first PUCCH carrying the first UCI is earliest.

In a possible implementation, the determining, by the network device, that the first UCI is dropped when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, includes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining, by the network device, that the first UCI is dropped if the first UCI is the CSI and the HARQ-ACKs carried by the plurality of second PUCCHs are HARQ-ACKs of corresponding SPS PDSCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining, by the network device, that the first UCI is dropped if the first UCI is the CSI and the HARQ-ACKs carried by the plurality of second PUCCHs are not transmitted using any PUCCH format among PUCCH format 2 or 3 or 4.

In a possible implementation, the determining, by the network device, that the first UCI is dropped when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, includes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining, by the network device, that the first UCI is dropped if the first UCI is the SR or a positive SR or the HARQ-ACK and the plurality of second PUCCHs use a PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining, by the network device, that the first UCI is dropped if the first UCI is an HARQ-ACK with more than 2 bits and the plurality of second PUCCHs use the PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, determining, by the network device, that the first UCI is dropped if it is determined that the plurality of HARQ-ACKs need to be transmitted simultaneously on the same PUCCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, determining, by the network device, that the first UCI is dropped if it is determined that the PUCCH carrying both of the first HARQ-ACK and the first UCI overlaps, in the time domain, with the PUCCH carrying the second HARQ-ACK, and the first HARQ-ACK and the second HARQ-ACK are the HARQ-ACKs carried on two different second PUCCHS among the plurality of second PUCCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, determining, by the network device, that the first UCI is dropped if the start position of the first PUCCH carrying the first UCI is earliest.

On a terminal side, embodiments of the disclosure provide a communication device, including a memory and a processor. The memory is configured to store a program instruction, and the processor is configured to call the program instruction stored in the memory to execute according to an obtained program:

when a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACK does not overlap with each other in the time domain, dropping the first UCI;

or when the first PUCCH carrying the first UCI overlaps, in the time domain, with a second PUCCH carrying a first HARQ-ACK, dropping the first UCI, if it is determined that a third PUCCH carrying simultaneously the first HARQ-ACK and the first UCI overlaps, in the time domain, with a fourth PUCCH carrying a second HARQ-ACK;

and the first UCI is of an type of UCI other than the HARQ-ACK, or when the first UCI includes the HARQ-ACK, a priority of the HARQ-ACK in the first UCI is lower than a priority of the HARQ-ACK carried on the second PUCCH.

In a possible implementation, according to the obtained program, the processor executes:
when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if it is determined that the plurality of HARQ-ACKs need to be transmitted simultaneously on a same PUCCH.

In a possible implementation, according to the obtained program, the processor executes:
when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if it is determined that a PUCCH carrying simultaneously a first HARQ-ACK and the first UCI overlaps, in the time domain, with a PUCCH carrying a second HARQ-ACK; and
the first HARQ-ACK and the second HARQ-ACK are HARQ-ACKs carried on two different second PUCCHs among the plurality of second PUCCHs.

In a possible implementation, according to the obtained program, the processor executes:
when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if a start position of the first PUCCH carrying the first UCI is earliest.

In a possible implementation, according to the obtained program, the processor executes:
when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if the first UCI is channel state information, CSI, and the HARQ-ACKs carried by the plurality of second PUCCHs are HARQ-ACKs of semi-static scheduling, SPS, physical downlink shared channel, PDSCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI if the first UCI is the CSI and the HARQ-ACKs carried by the plurality of second PUCCHs are not transmitted using any PUCCH format among PUCCH format 2 or 3 or 4.

In a possible implementation, according to the obtained program, the processor executes:
when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if the first UCI is an SR or a positive SR or the HARQ-ACK and the plurality of second PUCCHs use a PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if the first UCI is an HARQ-ACK with more than 2 bits and the plurality of second PUCCHs use the PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, dropping the first UCI, if it is determined that the plurality of HARQ-ACKs need to be transmitted simultaneously on a same PUCCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, dropping the first UCI, if it is determined that the PUCCH carrying both of the first HARQ-ACK and the first UCI overlaps, in the time domain, with a PUCCH carrying the second HARQ-ACK, and the first HARQ-ACK and the second HARQ-ACK are HARQ-ACKs carried on two different second PUCCHS among the plurality of second PUCCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, dropping the first UCI, if a start position of the first PUCCH carrying the first UCI is earliest.

In a possible implementation, the first UCI includes any one or a combination of the following: CSI or SR.

On a network side, embodiments of the disclosure provide a communication device, including a memory and a processor. The memory is configured to store a program instruction, and the processor is configured to call the program instruction stored in the memory to execute according to an obtained program:

when a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACK does not overlap with each other in the time domain, determining that the first UCI is dropped; or when the first PUCCH carrying the first UCI overlaps, in the time domain, with a second PUCCH carrying a first HARQ-ACK, determining that the first UCI is dropped if it is determined that a third PUCCH carrying the first HARQ-ACK and the first UCI overlaps, in the time domain, with a fourth PUCCH carrying a second HARQ-ACK;

and the first UCI is of an type of UCI other than the HARQ-ACK, or when the first UCI includes the HARQ-ACK, a priority of the HARQ-ACK in the first UCI is lower than a priority of the HARQ-ACK carried on the second PUCCH.

In a possible implementation, according to the obtained program, the processor executes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped if it is determined that the plurality of HARQ-ACKs need to be transmitted simultaneously on a same PUCCH.

In a possible implementation, according to the obtained program, the processor executes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if it is determined that a PUCCH carrying both of the first HARQ-ACK and the first UCI overlaps, in the time domain, with a PUCCH carrying the second HARQ-ACK; and the first HARQ-ACK and the second HARQ-ACK are HARQ-ACKs carried on two different second PUCCHs among the plurality of second PUCCHs.

In a possible implementation, according to the obtained program, the processor executes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if a start position of the first PUCCH carrying the first UCI is earliest.

In a possible implementation, according to the obtained program, the processor executes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if the first UCI is channel state information, CSI, and the HARQ-ACKs carried by the plurality of second PUCCHs are HARQ-ACKs of semi-static scheduling, SPS, physical downlink shared channel, PDSCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if the first UCI is CSI and the HARQ-ACKs carried by the plurality of second PUCCHs are not transmitted using any PUCCH format among PUCCH format 2 or 3 or 4.

In a possible implementation, according to the obtained program, the processor executes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if the first UCI is a scheduling request, SR, or a positive SR or the HARQ-ACK and the plurality of second PUCCHs use a PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if the first UCI is an HARQ-ACK with more than 2 bits and the plurality of second PUCCHs use the PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, and the first UCI is the HARQ-ACK, determining that the first UCI is dropped if it is determined that the plurality of HARQ-ACKs need to be transmitted simultaneously on a same PUCCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, and the first UCI is the HARQ-ACK, determining that the first UCI is dropped if it is determined that the PUCCH carrying both of the first HARQ-ACK and the first UCI overlaps, in the time domain, with a PUCCH carrying the second HARQ-ACK, and the first HARQ-ACK and the second HARQ-ACK are the HARQ-ACKs carried on two different second PUCCHS among the plurality of second PUCCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, and the first UCI is the HARQ-ACK, determining that the first UCI is dropped if a start position of the first PUCCH carrying the first UCI is earliest.

In a possible implementation, the first UCI includes any one or a combination of the following: CSI or SR.

On a terminal side, embodiments of the disclosure provide an information transmission apparatus, including a determining device, configured to:

when a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACK does not overlap with each other in the time domain, drop the first UCI;

or when the first PUCCH carrying the first UCI overlaps, in the time domain, with a second PUCCH carrying a first HARQ-ACK, drop the first UCI, if it is determined that a third PUCCH carrying simultaneously the first HARQ-ACK and the first UCI overlaps, in the time domain, with a fourth PUCCH carrying a second HARQ-ACK;

and the first UCI is of an type of UCI other than the HARQ-ACK, or when the first UCI includes the HARQ-ACK, a priority of the HARQ-ACK in the first UCI is lower than a priority of the HARQ-ACK carried on the second PUCCH.

In a possible implementation, the determining device is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI, if it is determined that a plurality of HARQ-ACKS need to be transmitted simultaneously on the same PUCCH.

In a possible implementation, the determining device is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI, if it is determined that a PUCCH carrying both of the first HARQ-ACK and the first UCI overlaps, in the time domain, with a PUCCH carrying the second HARQ-ACK, and the first HARQ-ACK and the second HARQ-ACK are HARQ-ACKs carried on two different second PUCCHs among the plurality of second PUCCHs.

In a possible implementation, the determining device is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI if a start position of the first PUCCH carrying the first UCI is earliest.

In a possible implementation, the determining device is configured to:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI if the first UCI is the CSI and the HARQ-ACKs carried by the plurality of second PUCCHs are HARQ-ACKs of corresponding SPS PDSCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI if the first UCI is the CSI and the HARQ-ACKs carried by the plurality of second PUCCHs are not transmitted using any PUCCH format among PUCCH format 2 or 3 or 4.

In a possible implementation, the determining device is configured to:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI if the first UCI is the SR or a positive SR or the HARQ-ACK and the plurality of second PUCCHs use a PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI if the first UCI is an HARQ-ACK with more than 2 bits and the plurality of second PUCCHs use the PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, drop the first UCI, if it is determined that the plurality of HARQ-ACKs need to be transmitted simultaneously on the same PUCCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, drop the first UCI, if it is determined that the PUCCH carrying both of the first HARQ-ACK and the first UCI overlaps, in the time domain, with the PUCCH carrying the second HARQ-ACK and the first HARQ-ACK and the second HARQ-ACK are the HARQ-ACKs carried on two different second PUCCHS among the plurality of second PUCCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, drop the first UCI if the start position of the first PUCCH carrying the first UCI is earliest.

In a possible implementation, the first UCI includes any one or a combination of the following: CSI or SR.

On a network side, embodiments of the disclosure provide an information transmission apparatus, including a determining device, configured to:

when a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACK does not overlap with each other in the time domain, determine that the first UCI is dropped;

or when the first PUCCH carrying the first UCI overlaps, in the time domain, with a second PUCCH carrying a first HARQ-ACK, determine that the first UCI is dropped if it is determined that a third PUCCH carrying the first HARQ-ACK and the first UCI overlaps, in the time domain, with a fourth PUCCH carrying a second HARQ-ACK;

and the first UCI is of an type of UCI other than the HARQ-ACK, or when the first UCI includes the HARQ-ACK, a priority of the HARQ-ACK in the first UCI is lower than a priority of the HARQ-ACK carried on the second PUCCH.

In a possible implementation, the determining device is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if it is determined that a plurality of HARQ-ACKs need to be transmitted simultaneously on the same PUCCH.

In a possible implementation, the determining device is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if it is determined that a PUCCH carrying both of the first HARQ-ACK and the first UCI overlaps, in the time domain, with a PUCCH carrying the second HARQ-ACK; and the first HARQ-ACK and the second HARQ-ACK are HARQ-ACKs carried on two different second PUCCHs among the plurality of second PUCCHs.

In a possible implementation, the determining device is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if a start position of the first PUCCH carrying the first UCI is earliest.

In a possible implementation, the determining device is configured to:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if the first UCI is the CSI and the HARQ-ACKs carried by the plurality of second PUCCHs are HARQ-ACKs of SPS PDSCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if the first UCI is the CSI and the HARQ-ACKs carried by the plurality of second PUCCHs are not transmitted using any PUCCH format among PUCCH format 2 or 3 or 4.

In a possible implementation, the determining device is configured to:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if the first UCI is the SR or a positive SR or the HARQ-ACK and the plurality of second PUCCHs use a PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if the first UCI is an HARQ-ACK with more than 2 bits and the plurality of second PUCCHs use the PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, determine that the first UCI is dropped if it is determined that the plurality of HARQ-ACKs need to be transmitted simultaneously on the same PUCCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, determine that the first UCI is dropped if it is determined that the PUCCH carrying both of the first HARQ-ACK and the first UCI overlaps, in the time domain, with the PUCCH carrying the second HARQ-ACK, and the first HARQ-ACK and the second HARQ-ACK are the HARQ-ACKs carried on two different second PUCCHS among the plurality of second PUCCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, determine that the first UCI is dropped if the start position of the first PUCCH carrying the first UCI is earliest.

In a possible implementation, the first UCI includes any one or a combination of the following: CSI or SR.

Embodiments of the disclosure provide an information transmission system, including the above terminal device and the above network device. The terminal device can execute the above information transmission method described on the terminal side. The network device can execute the above information transmission method described on the network side.

Embodiments of the disclosure provide a computer readable storage medium, storing a computer executable instruction. The computer executable instruction is configured to enable a computer to execute steps included in the information transmission method in all aspects mentioned above.

Embodiments of the disclosure provide a computer program product containing an instruction. When the computer program product runs on a computer, the computer is enabled to execute the information transmission method described in all the possible implementations mentioned above.

It should be understood that the above general description and the following detailed description are only exemplary and explanatory instead of limiting the disclosure.

BRIEF DESCRIPTION OF THE DRAWINGS

In order to set forth embodiments of the disclosure more clearly, accompanying drawings needed in the description of the embodiments will be briefly introduced below. The drawings in the following description are only some of embodiments of the disclosure.

FIG. 3 is a schematic flowchart of an information transmission method in embodiments of the disclosure.

FIG. 4A is a schematic diagram that a plurality of PUCCHs carrying a plurality of HARQ-ACKs and not overlapping in the time domain, overlap in time domain with a PUCCH carrying first UCI in embodiments of the disclosure.

FIG. 17 is another schematic flowchart of an information transmission method in embodiments of the disclosure.

FIG. 18 is a schematic structural diagram of a communication device in embodiments of the disclosure.

DETAILED DESCRIPTION OF THE EMBODIMENTS

Figure 1:
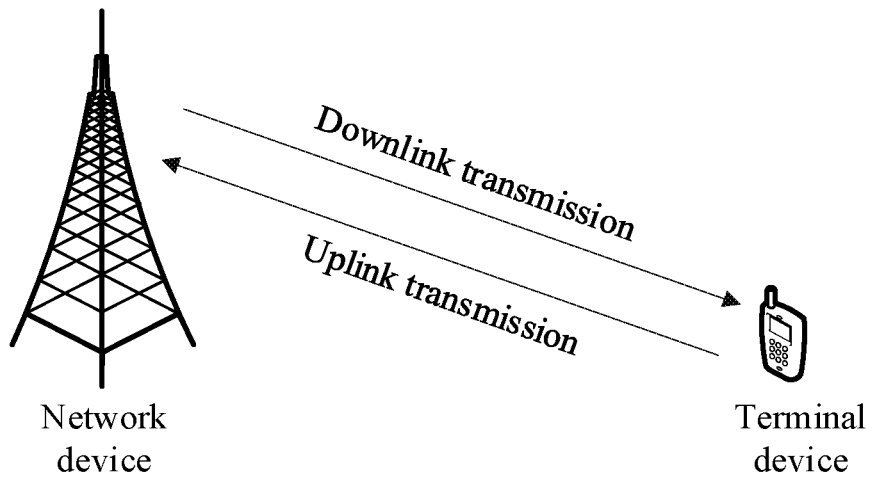
FIG. 1 is a schematic diagram of an application scenario in embodiments of the disclosure.

Terms "first" and "second" in the specification, the claims and the above drawings of the disclosure are used for distinguishing different objects rather intend to describe a specific sequence. Besides, a term "include" and any of its transformations intend to cover non-exclusive protections. For example, a process, method, system, product or device containing a series of steps or devices are not limited to containing listed steps or devices but still may include non-listed steps or devices or still may include other steps or devices inherent in the process, method, product or device. "A plurality of" in the disclosure may represent at least two, for example, two, or three or more, and is not limited by embodiments of the disclosure.

Besides, a term "and/or" herein is only an association relation for describing associated objects, which means that there may be three relations, for example, A and/or B may represent three cases of: only A exists, both A and B exist at the same time, and only B exists. Moreover, a character "/" herein generally represents that associated objects before or after it have an "and/or" relation without special description.

Before embodiments of the disclosure are introduced, part of words in the disclosure are explained to make those skilled in the art understand them easily.

1) A terminal device includes a device providing voice and/or data connectivity for a user, for example, it may include a hand-held device with a wireless connection function or a processing device connected to a wireless modem. The terminal device may communicate with a core network via a radio access network (RAN) to interchange voice and/or data with the RAN. The terminal device may include user equipment (UE), a wireless terminal device, a mobile terminal device, a device-to-device (D2D) terminal device, a V2X terminal device, a machine-to-machine/machine-type communications (M2M/MTC) terminal device, an Internet of things (IoT) terminal device, a subscriber device, a subscriber station, a mobile station, a remote station, an access point (AP), a remote terminal, an access terminal, a user terminal, a user agent, a user device, etc. For example, it may include a mobile phone (or called "cellular phone"), a computer with a mobile terminal device, a portable or pocket or hand-held or in-computer mobile apparatus, etc. For example, it may include a personal communication service (PCS) phone, a cordless telephone, a session initiation protocol (SIP) phone, a wireless local loop (WLL) station, a personal digital assistant (PDA), etc. It may include a limited device, for example, a low-power-consumption device, or a limited-storage-capacity device, or a limited-computing-capacity device, etc. For example, it includes an information sensing device such as a bar code, a radio frequency identification (RFID), a sensor, a global positioning system (GPS), a laser scanner, etc.

In embodiments of the disclosure, the terminal device may also be a wearable device as an example but not a limit. The wearable device may also be called a smart wearable device and is a generic term of devices which is developed to wear by making a smart design of daily wear through a wearable technology, for example, glasses, gloves, a watch, clothes, shoes, etc. The wearable device is a portable device which is directly put on a human body or integrated into clothes or accessories of a user. The wearable device not only is a hardware device, but also realizes a powerful function through software support, data interaction, and cloud interaction. The smart wearable device, broadly defined, includes a device with complete functions and a large size and independent of a smart phone to realize all or part of its functions, for example: a smart watch or smart glasses, etc., and a device dedicated to only a certain type of application function and needing to cooperate with other devices such as the smart phone, for example, various smart wristbands for physical sign monitoring, a smart helmet, smart jewelry, etc.

The various terminal devices introduced above, if located on a vehicle (for example, put or mounted in the vehicle), may be regarded as a vehicle-mounted terminal device which is, for example, also called an on-board unit (OBU).

In embodiments of the disclosure, the terminal device may further include a relay. Or it is understood that whatever can perform data communication with a base station may be regarded as the terminal device.

2) A network device may refer to a device communicating with a wireless terminal device in a radio through one or more cells in an access network. The network device may be a node in a radio access network, or called the base station, or called a radio access network (RAN) node (or device). At present, examples of some network devices are: a gNB, a transmission reception point (TRP), an evolved Node B (eNB), a radio network controller (RNC), a Node B (NB), a base station controller (BSC), a base transceiver station (BTS), a home base station (for example, a home evolved NodeB or a home Node B (HNB)), a base band unit (BBU), or a wireless fidelity (Wifi) access point (AP), etc. Besides, in a network structure, the network side may include a centralized unit (CU) node and a distributed unit (DU) node. This structure separates a protocol layer of an eNB in a long term evolution (LTE) system, part of functions of the protocol layer are centrally controlled by an CU, and part of or all of the remaining functions of the protocol layer are distributed in a DU which is centrally controlled by the CU.

An application scenario of embodiments of the disclosure is introduced below.

FIG. 1 shows a schematic diagram of a possible application scenario of embodiments of the disclosure. The application scenario includes a network device and a terminal device. Functions of the network device and the terminal device are described above and will not be repeated here. The terminal device is in wireless connection with the network device. Data communication can be performed between the terminal device and the network device, for example, sending data from the network device to the terminal device is called downlink transmission, and sending data from the terminal device to the network device is called uplink transmission. The application scenario shown in FIG. 1 may be an application scenario in an NR system, or an application scenario in an LTE system, for example, if the application scenario shown in FIG. 1 is the application scenario in the NR system, the network device in the application scenario may be a gNB in the NR system, and the terminal device in the application scenario may be a terminal device in the NR system.

It should be noted that the scenario shown in FIG. 1 is not supposed to limit an application scenario of the embodiment of the disclosure, and in actual application, a plurality of network devices and a plurality of terminal devices may be included. For example, one terminal device may perform data transmission with only one network device or with the plurality of network devices, or one network device may perform data transmission with only one terminal device or the plurality of terminal devices, that is, the quantity of the terminal device and the quantity of network devices in FIG. 1 are only examples, and in actual application, one network device can provide service for the plurality of terminal devices, which is not specifically limited by the embodiment of the disclosure.

With reference to the application scenario shown in FIG. 1, a multiplexing transmission solution in an NR R15 system is introduced below before a multiplexing transmission solution of UCI in an NR R16 system is introduced.

In the NR R15 system, when a PUCCH carrying CSI/SR overlaps with a PUCCH carrying a HARQ-ACK, multiplexing transmission is performed according to the following method.

1) When the PUCCH carrying the SR overlaps with the PUCCH carrying the HARQ-ACK and the PUCCH carrying the HARQ-ACK uses a PUCCH format 0 (the PUCCH carrying the SR may use the format 0 or a format 1), the SR and the HARQ-ACK are transmitted on a PUCCH resource of the HARQ-ACK. That is, the HARQ-ACK is transmitted with different cyclic shifts (CSs) corresponding to a positive SR and a negative SR on the PUCCH resource of the HARQ-ACK to implicitly express the SR as positive or negative.

2) When the PUCCH carrying the SR overlaps with the PUCCH carrying the HARQ-ACK and the PUCCH carrying the SR uses the format 0 (the PUCCH format 0) and the PUCCH carrying the HARQ-ACK uses the format 1 (a PUCCH format 1), the SR is dropped, that is, multiplexing transmission is not performed at the moment.

3) When the PUCCH carrying the SR overlaps with the PUCCH carrying the HARQ-ACK, the PUCCH carrying the SR uses the format 1 and the PUCCH carrying the HARQ-ACK uses the format 1, when the positive SR exists, the HARQ-ACK is transmitted on a PUCCH resource of the SR, and it is implicitly expressed that SR transmission exists at the same time by transmitting the HARQ-ACK on the PUCCH resource of the SR, otherwise (namely the negative SR exists), the HARQ-ACK is transmitted on the PUCCH resource of the HARQ-ACK.

4) When the PUCCH carrying the SR overlaps with the PUCCH carrying the HARQ-ACK and the PUCCH carrying the HARQ-ACK uses a format 2 or 3 or 4 (the PUCCH carrying the SR may use the format 0 or the format 1), a PUCCH resource set is determined according to a total quantity of bits of the SR and the HARQ-ACK. A PUCCH resource is determined in the PUCCH resource set according to a PUCCH resource indication field in DCI to which the HARQ-ACK corresponds to simultaneously transmit the SR and the HARQ-ACK. Here the SR is X bits, representing SR states (which is positive or all are negative) of the X SRs of which PUCCH overlaps with that of the HARQ-ACK, that is, the X bits of SRs is always transmitted in spite of whether the SR is positive or negative to avoid change of the quantity of bits of UCI transmitted on the PUCCH resource of the HARQ-ACK due to the SR states.

5) When a PUCCH carrying a semi-static scheduling (SPS) HARQ-ACK (that is, a HARQ-ACK of a SPS physical downlink shared channel (PDSCH)) overlaps with a PUCCH carrying CSI, the SPS HARQ-ACK is transferred onto a PUCCH resource of the CSI for multiplexing transmission together with the CSI.

6) When a PUCCH carrying a dynamic HARQ-ACK (namely a HARQ-ACK of a PDSCH having corresponding downlink control information (DCI) scheduling or a HARQ-ACK of DCI indicating a downlink SPS PDSCH release) overlaps with the PUCCH carrying the CSI, a PUCCH resource set is selected from a plurality of PUCCH resource sets according to a total quantity of bits of the HARQ-ACK and the CSI. A PUCCH resource is determined from the selected PUCCH resource set according to the PUCCH resource indication field in the DCI to which the HARQ-ACK corresponds to simultaneously carry the HARQ-ACK and the CSI. At this moment, the re-determined PUCCH resource is possibly the same as or different from the original PUCCH resource carrying the HARQ-ACK (if different, there is a new PUCCH resource).

When there are a plurality of PUCCHs in a slot and overlapping of the PUCCHs exists, it is assumed that, the PUCCHs in the slot form a set Q, an uplink channel whose start time is earliest in the set Q is determined as a channel A, and a channel set X overlapping with the channel A is determined. A channel resource for multiplexing transmission is obtained for UCI on the channel A and all channels in the channel set X according to the above multiplexing transmission rule, the channel resource for multiplexing transmission replaces the channel A and all channels in the channel set X in the set Q. The above step is continued, a channel A and a channel set X are determined in a new set Q, and so on till a plurality of PUCCHs which do not overlap in a time domain are obtained.

In release 15, there is a case of only one PUCCH resource of the HARQ-ACK overlapping with the PUCCH resource of the CSI/SR, without a case as in release 16, where a plurality of time division multiplexing PUCCHs used for carrying HARQ-ACKs overlapping with one PUCCH resource used for carrying the SR/CSI. Therefore, in release 16, the supported transmission of the plurality of time division multiplexing PUCCHs used for carrying the HARQ-ACKs in the slot, will cause the overlapping of the plurality of PUCCHs carrying the HARQ-ACKs with the PUCCH carrying the SR/CSI. In this case, there is no specific multiplexing transmission method at present, and if the above multiplexing transmission method is simply and directly reused, a plurality of HARQ-ACKs planned for TDM transmission may need to be transmitted on the same PUCCH by multiplexing, which will affect a transmission time delay and transmission performance of the HARQ-ACKs. For example, if transmission time of the PUCCH resource for multiplexing transmission of the plurality of HARQ-ACKs is longer than that of the original PUCCH resource carrying the HARQ-ACK, or its start position lags behind that of the original PUCCH resource, the transmission time delay is prolonged compared with that of the original HARQ-ACK transmission. For another example, as the PUCCH resource for multiplexing transmission of the plurality of HARQ-ACKs carry much more UCI, it transmission bit rate is higher than that of the original PUCCH resource carrying the HARQ-ACK, and consequently the transmission performance is reduced compared with that of the original HARQ-ACK. An information transmission solution provided by embodiments of the disclosure intends to solve the problem that in the slot, the PUCCHs carrying the plurality of HARQ-ACKs overlap, in the time domain, with the PUCCH carrying other types of UCI to provide a multiplexing transmission solution of the plurality of HARQ-ACKs and the other types of UCI in the slot.

The embodiments of the disclosure is introduced below with reference to the drawings.

Figure 2:
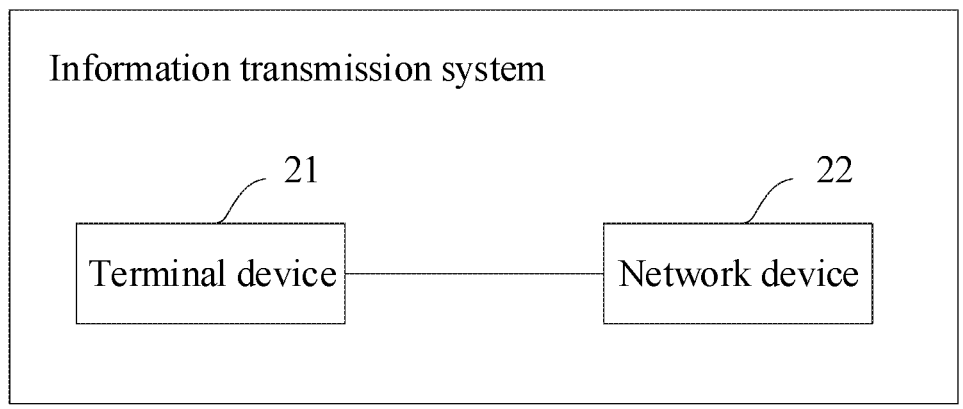
FIG. 2 is a schematic architectural diagram of an information transmission system in embodiments of the disclosure.

As shown in FIG. 2, an information transmission system provided by embodiments of the disclosure includes a terminal device 21 and a network device 22. The terminal device 21 is, for example, a terminal device introduced above. The network device 22 is, for example, a network device introduced above.

In an embodiment, the terminal device 21 is configured to drop first UCI when a first PUCCH carrying the first UCI overlaps, in a time domain, with each of a plurality of second PUCCHs carrying HARQ-ACKs and not overlapping in time domain. Correspondingly, the network device 22 is configured to determine that the first UCI is dropped when the first PUCCH carrying the first UCI overlaps, in the time domain, with the plurality of second PUCCHs carrying the HARQ-ACKs and not overlapping in the time domain.

The first UCI is other types of UCI different from the HARQ-ACK, for example, the first UCI is an SR or CSI or contains both the CSI and the SR, that is, the first UCI is the CSI and/or the SR.

In another possibility, the first UCI is the HARQ-ACK, and a priority of the HARQ-ACK to which the first UCI corresponds is lower than that of the HARQ-ACKs carried on the second PUCCHs. For example, the HARQ-ACK in the first UCI corresponds to a first service type, the HARQ-ACKs carried on the second PUCCHs correspond to a second service type, and the priority of the first service type is lower than that of the second service type. For another example, the HARQ-ACK in the first UCI corresponds to an enhance mobile broadband (eMBB) service, and the HARQ-ACKs carried on the second PUCCHs correspond to an ultra reliable low latency communications (URLLC) service. For another example, the HARQ-ACK in the first UCI corresponds to a first priority level, the HARQ-ACKs carried on the second PUCCHs correspond to a second priority level, and the first priority level is smaller than or equal to the second priority level, etc.

The plurality of second PUCCHs carrying the HARQ-ACKs and not overlapping with each other in time domain are located in one slot. That is, embodiments of the disclosure can be applied to an application scenario supporting to transmit the plurality of HARQ-ACKs in TDM mode in the slot, and there is a case that the plurality of second PUCCHs used for carrying the plurality of HARQ-ACKs each overlaps, in the time domain, with the first PUCCH carrying the first UCI. That is, in embodiments of the disclosure, the plurality of second PUCCHs and the first PUCCH are located in the same slot, the plurality of second PUCCHs do not overlap with each other in the time domain, while the plurality of second PUCCHs each overlaps, in the time domain, with the first PUCCH.

Therefore, in the slot, when PUCCH resources of the plurality of HARQ-ACKs overlap, in the time domain, with a PUCCH resource of the first UCI, the terminal device 21 may drop the first UCI. Correspondingly, the network device 22 may determine that the first UCI is dropped based on the same understanding as the terminal device 21.

Through the above solution, it can be guaranteed that on the terminal side and the network side, under the condition of overlapping of transmission resources of the different UCI in the time domain, multiplexing transmission on the same one PUCCH of the plurality of HARQ-ACKs originally in TDM transmission is avoided by dropping some UCI, and the problem of time-domain overlapping is solved, the transmission time delay of the HARQ-ACKs can be shortened, the transmission performance of the HARQ-ACKs can be improved, and then the HARQ-ACKs can be transmitted effectively and timely.

In another embodiment, the terminal device 21 is configured to drop first UCI if it is determined that a third PUCCH carrying a first HARQ-ACK and the first UCI overlaps, in the time domain, with a fourth PUCCH carrying a second HARQ-ACK when the first PUCCH carrying the first UCI overlaps, in the time domain, with the second PUCCH carrying the first HARQ-ACK. Correspondingly, the network device 22 is configured to determine that the first UCI is dropped if it is determined that the third PUCCH carrying the first HARQ-ACK and the first UCI overlaps, in the time domain, with the fourth PUCCH carrying the second HARQ-ACK when the first PUCCH carrying the first UCI overlaps, in the time domain, with the second PUCCH carrying the first HARQ-ACK.

The first HARQ-ACK and the second HARQ-ACK can be transmitted in one slot, that is, the second PUCCH carrying the first HARQ-ACK and the fourth PUCCH carrying the second HARQ-ACK are located in the slot and do not overlap in the time domain. The first PUCCH carrying the first UCI is also located in this slot. In other words, in embodiments of the disclosure, the first PUCCH, the second PUCCH and the fourth PUCCH are located in the same slot, and the second PUCCH and the fourth PUCCH do not overlap in the time domain.

Accordingly, the terminal device 21 can drop the first UCI if for example, a PUCCH resource (for example, the third PUCCH) determined according to the multiplexing transmission rule and used for carrying the first HARQ-ACK and the first UCI overlaps, in the time domain, with a PUCCH resource (for example, the fourth PUCCH) carrying another HARQ-ACK (for example, the second HARQ-ACK), when in the slot a PUCCH resource of an HARQ-ACK (for example, the first HARQ-ACK) overlaps, in the time domain, with a PUCCH resource of an other types of UCI (for example, the first UCI). Correspondingly, the network device 22 may determine that the first UCI is dropped based on the same understanding as the terminal device 21.

Through the above solution, it can be guaranteed that on the terminal side and the network side, under the condition of overlapping of the transmission resources of the different UCI in the time domain, understanding of dropping the UCI is consistent, and thus the problem of overlapping in the time domain of the transmission resources of the UCI is solved.

The information transmission solution in embodiments of the disclosure will be described in detail below with reference to the drawings.

Referring to FIG. 3, a schematic flowchart of an information transmission method provided by embodiments of the disclosure. The method can be executed by a terminal device and specifically includes the following steps.

Step 31: the terminal device determines that a first PUCCH carrying first UCI overlaps, in a time domain, with each of a plurality of second PUCCHs carrying HARQ-ACKs and each of the plurality of second PUCCHs does not overlap with each other in time domain; or the terminal device determines that the first PUCCH carrying the first UCI overlaps, in the time domain, with the second PUCCH carrying a first HARQ-ACK and that a third PUCCH carrying the first HARQ-ACK and the first UCI overlaps, in the time domain, with a fourth PUCCH carrying a second HARQ-ACK.

Step 32: the terminal device drops the first UCI.

That is, when there are the two overlapping cases mentioned above, the terminal device can directly drop the first UCI to guarantee effective transmission of the HARQ-ACKs to the greatest extent, and improve effectiveness and timeliness of transmission of the UCI, namely the HARQ-ACK.

In embodiments of the disclosure, there are many cases of overlapping, in the time domain, of the plurality of second PUCCHs and the first PUCCH, which will be described below respectively.

A first case: each of the second PUCCHs completely overlaps with the first PUCCH in the time domain. As shown in FIG. 4A, it is a schematic diagram that a first PUCCH carrying first UCI overlaps, in a time domain, with a plurality of PUCCHs carrying HARQ-ACKs provided by embodiments of the disclosure. For example, a PUCCH resource of the first UCI is PUCCH resource-0 and occupies 8 symbols; a PUCCH resource of HARQ-ACK-1 of the two HARQ-ACKs is PUCCH-1 and occupies 2 symbols, and a PUCCH resource of HARQ-ACK-2 is PUCCH-2 and occupies 2 symbols. It can be seen from FIG. 4A that the PUCCH resource (PUCCH-0) of the first UCI completely overlaps with each of the PUCCH resources (PUCCH-1 and PUCCH-2) of the two second HARQ-ACKs (namely, the HARQ-ACK-1 and the HARQ-ACK-2).

Figure 4B:
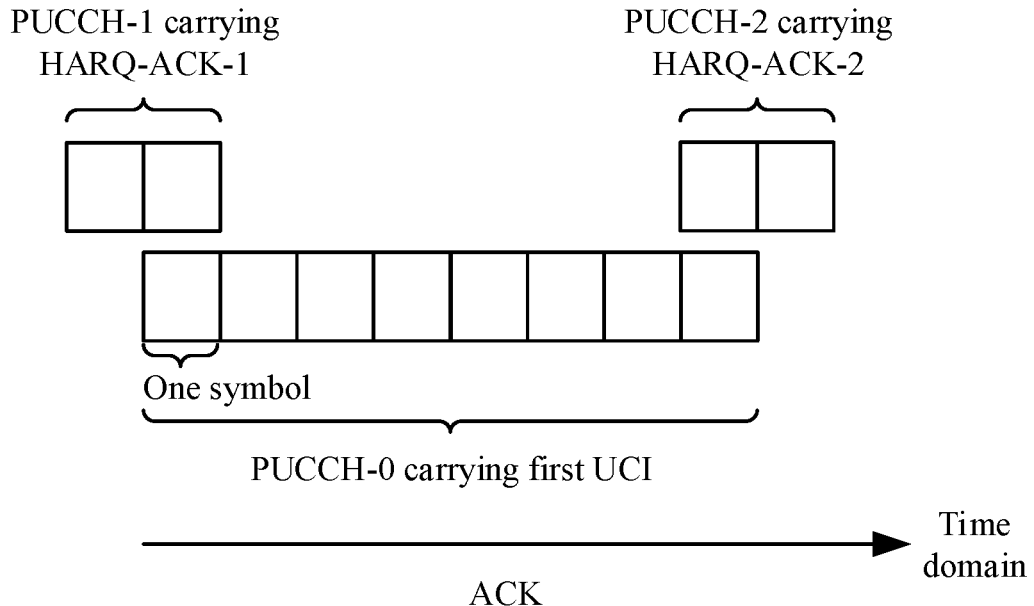
FIG. 4B is another schematic diagram that a plurality of PUCCHs carrying a plurality of HARQ-ACKs and not overlapping in a time domain, overlap in time domain with a PUCCH carrying first UCI in embodiments of the disclosure.

A second case: each of the second PUCCHs partially overlaps with the first PUCCH in the time domain. As shown in FIG. 4B, it is another schematic diagram that a first PUCCH carrying first UCI overlaps, in a time domain, with each of a plurality of second PUCCHs provided by embodiments of the disclosure. For example, the PUCCH resource of the first UCI is PUCCH-0 and occupies 8 symbols, the PUCCH resource of HARQ-ACK-1 of the two HARQ-ACKs is PUCCH-1 and occupies 2 symbols, and the PUCCH resource of HARQ-ACK-2 is PUCCH-2 and occupies 2 symbols. It can be seen from FIG. 4B that the PUCCH resource (PUCCH-0) of the first UCI partially overlaps with each of the PUCCH resources (PUCCH-1 and PUCCH-2) of the two HARQ-ACKs.

Figure 4C:
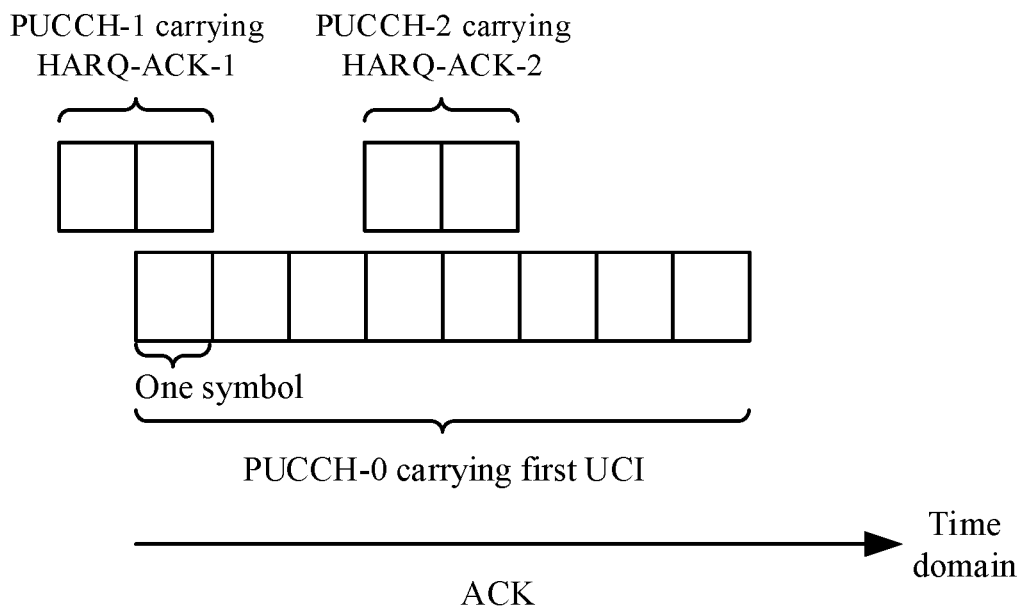
FIG. 4C is another schematic diagram that a plurality of PUCCHs carrying a plurality of HARQ-ACKs and not overlapping in a time domain, overlap in time domain with a PUCCH carrying first UCI in embodiments of the disclosure.

A third case: a part of the PUCCHs of the HARQ-ACKs completely overlap with the PUCCH resource of the first UCI, and part of the PUCCHs of the HARQ-ACKs partially overlap with the PUCCH resource of the first UCI. As shown in FIG. 4C, it is another schematic diagram that a first PUCCH carrying first UCI overlaps, in a time domain, with each of a plurality of second PUCCHs provided by embodiments of the disclosure. If the PUCCH resource of the first UCI is PUCCH-0 and occupies 8 symbols, the PUCCH resource of HARQ-ACK-1 of the two HARQ-ACKs is PUCCH-1 and occupies 2 symbols, and the PUCCH resource of HARQ-ACK-2 is PUCCH-2 and occupies 2 symbols. It can be seen from FIG. 4C that the PUCCH resource (PUCCH-0) of the first UCI partially overlaps with the PUCCH resource (PUCCH-1) of one HARQ-ACK (namely, HARQ-ACK-1) and completely overlaps with the PUCCH resource (PUCCH-2) of the other HARQ-ACK (namely, HARQ-ACK-2).

As described above, in embodiments of the disclosure, the first UCI may be CSI and/or SR, or the first UCI may be an HARQ-ACK whose priority is lower than that of the HARQ-ACKs carried on the second PUCCHs. The first UCI may be different types of UCI, which will be introduced below respectively.

Example 1

Figure 5A:
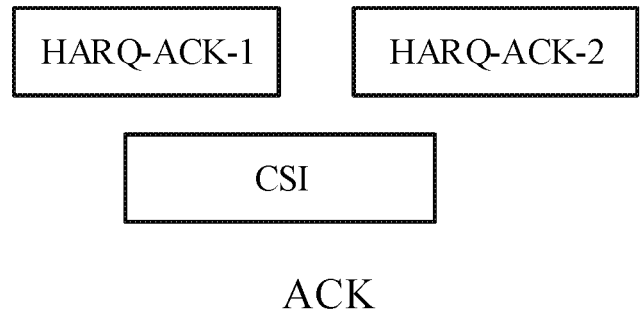
FIG. 5A is a schematic diagram that two PUCCHs carrying two HARQ-ACKs and not overlapping in a time domain, overlap in the time domain with a PUCCH carrying CSI in embodiments of the disclosure.
Figure 5B:
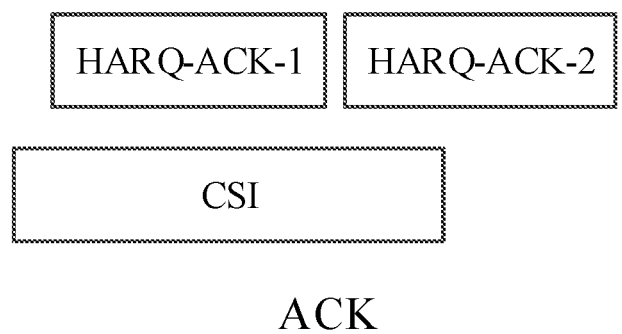
FIG. 5B is another schematic diagram that two PUCCHs carrying two HARQ-ACKs and not overlapping in a time domain, overlap in the time domain with a PUCCH carrying CSI in embodiments of the disclosure.

In example 1, that is, a first PUCCH carrying first UCI overlaps, in a time domain, with each of a plurality of second PUCCHs carrying HARQ-ACKs and not overlapping with each other in time domain, for example, two second PUCCHs carrying the HARQ-ACKs both overlap with a PUCCH resource carrying CSI, for example, shown in FIG. 5A to FIG. 5B.

In embodiments of the disclosure, as described above, the plurality of second PUCCHs used for carrying the plurality of HARQ-ACKs are located in one slot and do not overlap, for example, respectively located in different sub-slots in the slot, the first PUCCH carrying the CSI and the plurality of second PUCCHs carrying the plurality of HARQ-ACKs are located in the same slot, and the plurality of second PUCCHs overlap, in the time domain, with the first PUCCH, namely, each of the second PUCCHs overlaps, in the time domain, with the first PUCCH. The sub-slot is a time device of a fixed symbol quantity in an appointed or configured slot. A sequence of the sub-slots in the slot, a position of each sub-slot and the quantity of symbols contained in the sub-slots are appointed or configured in advance. The quantities of the symbols contained in the different sub-slots in the slot are the same or different. That is, the quantity of symbols contained in each sub-slot contained in the same slot may be the same, for example, 7 or 2 symbols. Of course, the quantity of symbols contained in each sub-slot may be different, for example, a first sub-slot includes 4 symbols, a second sub-slot includes 3 symbols, and the specific quantity of symbols may be appointed or configured in advance.

Referring to FIG. 5A to FIG. 5B, in which taking the first UCI being the CSI for example, the case of overlapping, in the time domain, of the PUCCH resources used for carrying the two HARQ-ACKs with the PUCCH resource used for carrying the CSI is illustrated. In FIG. 5A, each of the two PUCCHs used for carrying the HARQ-ACK-1 and the HARQ-ACK-2 partially overlap with the PUCCH carrying the CSI. In FIG. 5B, the PUCCH carrying the HARQ-ACK-1 completely overlaps with the PUCCH carrying the CSI, and the PUCCH carrying the HARQ-ACK-2 partially overlaps with the PUCCH carrying the CSI.

Figure 6:
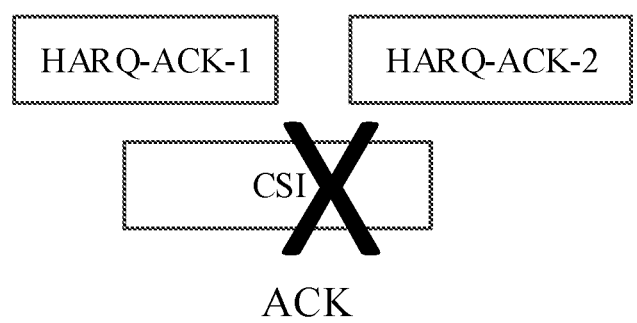
FIG. 6 is a schematic diagram of dropping CSI in embodiments of the disclosure.

That is, the terminal device can directly drop the CSI when the first PUCCH carrying the CSI overlaps, in the time domain, with the plurality of second PUCCHs carrying the plurality of HARQ-ACKs and not overlapping in the time domain, as shown in FIG. 6, and overlapping of the CSI and the HARQ-ACKs can be avoided. After dropping the CSI, the terminal device can transmit the HARQ-ACKs on the PUCCH resources to which the HARQ-ACKs correspond, that is, the corresponding HARQ-ACKs can be independently transmitted on the PUCCH resources configured originally for each of the HARQ-ACKs. That is, the corresponding HARQ-ACK can be transmitted on each second PUCCH, and thus it can be guaranteed that the HARQ-ACKs can be transmitted effectively and timely.

In embodiments of the disclosure, when the first PUCCH carrying the CSI overlaps, in the time domain, with the plurality of second PUCCHs carrying the HARQ-ACKs and not overlapping with each other in time domain, the terminal device can further determine whether a preset dropping condition is met, if the preset dropping condition is met, the terminal device drops the first UCI, if the preset dropping condition is not met, the terminal device does not drop the CSI. That is, the preset dropping condition can be used as a judgment basis of whether the CSI is finally dropped.

Possible cases of the preset dropping condition will be described below with reference to the drawings, that is, the terminal device can determine whether the CSI is dropped in the following determining manners.

A First Determining Manner

The terminal device drops the CSI if it is determined that the plurality of HARQ-ACKs need to be transmitted simultaneously on the same PUCCH when the first PUCCH carrying the CSI overlaps, in the time domain, with the plurality of second PUCCHs carrying the HARQ-ACKs and not overlapping with each other in time domain.

In a specific implementation process, whether the plurality of HARQ-ACKs need to be transmitted simultaneously on the same PUCCH can be determined by using the existing multiplexing transmission rule, which is specifically as follows.

In a first example, based on the case of FIG. 5A, it is assumed that, a PUCCH carrying a first HARQ-ACK (namely HARQ-ACK-1) uses the PUCCH format 2 or 3 or 4, according to the existing multiplexing transmission rule of overlapping of a plurality of channels, a channel A whose start time is earliest is determined, namely the PUCCH carrying HARQ-ACK-1 is determined, a channel set X overlapping with the channel A is determined as a PUCCH carrying the CSI, a PUCCH resource set is determined according to a total quantity of bits of the HARQ-ACK-1 and the CSI based on the multiplexing rule, and a PUCCH resource is determined in the determined PUCCH resource set according to a PUCCH resource indication field in DCI to which the HARQ-ACK-1 corresponds to carry the HARQ-ACK-1 and the CSI for simultaneous transmission. The resource is continuously used to replace the resource A (that is the PUCCH carrying the HARQ-ACK-1) and the set X (that is the PUCCH carrying CSI), and the above multiplexing transmission rule is further repeated for the overlapping channels.

Figure 7A:
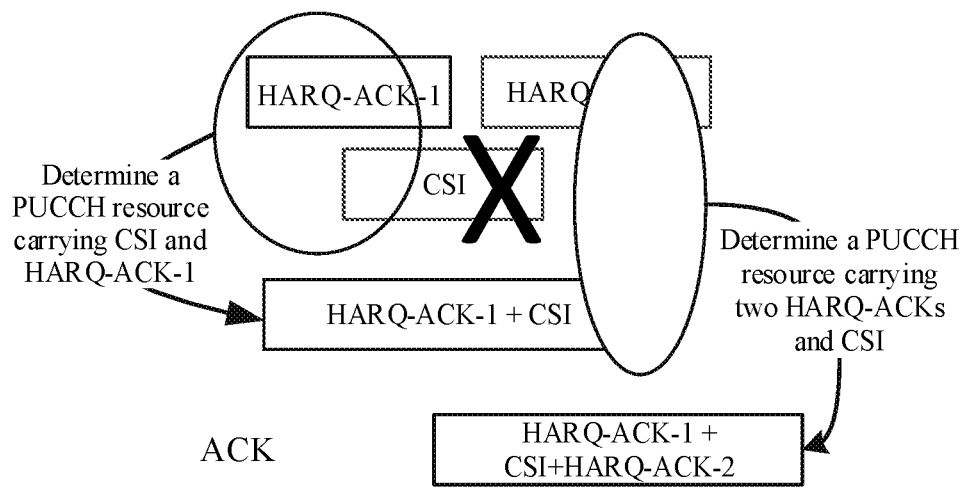
FIG. 7A is a schematic diagram of determining whether to drop CSI according to a multiplexing transmission rule in embodiments of the disclosure.

1) If the determined multiplexing resource overlaps, in the time domain, with another HARQ-ACK (for example, HARQ-ACK-2 in FIG. 5A), as shown in FIG. 7A, according to the multiplexing transmission rule, the resource A is determined as the PUCCH resource carrying the first HARQ-ACK (namely HARQ-ACK-1) and the CSI, the set X overlapping with the resource A are determined as the PUCCH carrying second HARQ-ACK (namely HARQ-ACK-2), then according to the multiplexing transmission rule, a PUCCH resource needs to be found according to a total quantity of bits of the first HARQ-ACK, the CSI and the second HARQ-ACK to simultaneously transmit the first HARQ-ACK, the CSI and the second HARQ-ACK (a detail step of determining this resource is similar to the above step, the PUCCH resource set is determined according to the total quantity of bits, and the PUCCH resource is determined according to the PUCCH resource indication field in the DCI to which the HARQ-ACK corresponds). That is, the CSI is dropped when it is determined that the plurality of TDM HARQ-ACKs need to be transmitted on the same PUCCH according to the multiplexing transmission rule, and as there is no overlapping of the CSI and the HARQ-ACKs after the CSI is dropped, the two HARQ-ACKs can be independently transmitted on their own resources.

Figure 7B:
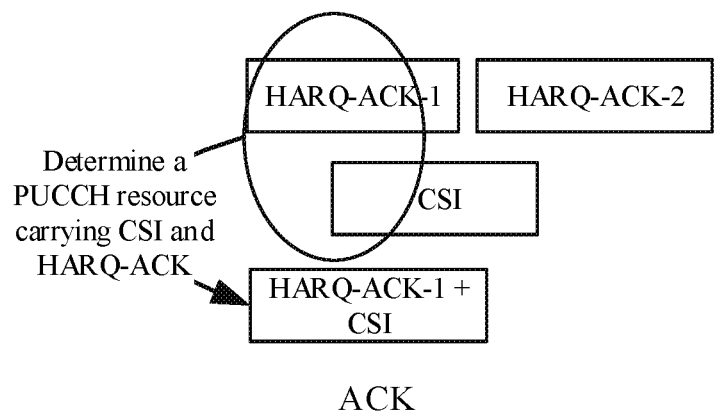
FIG. 7B is another schematic diagram of determining whether to drop CSI according to a multiplexing transmission rule in embodiments of the disclosure.

2) If the determined multiplexing resource does not overlap with that of the HARQ-ACK-2 in the time domain, as shown in FIG. 7B, the HARQ-ACK-1 and the CSI are simultaneously transmitted on this multiplexing resource, and HARQ-ACK-2 is directly transmitted on the PUCCH of the HARQ-ACK-2.

Figure 7C:
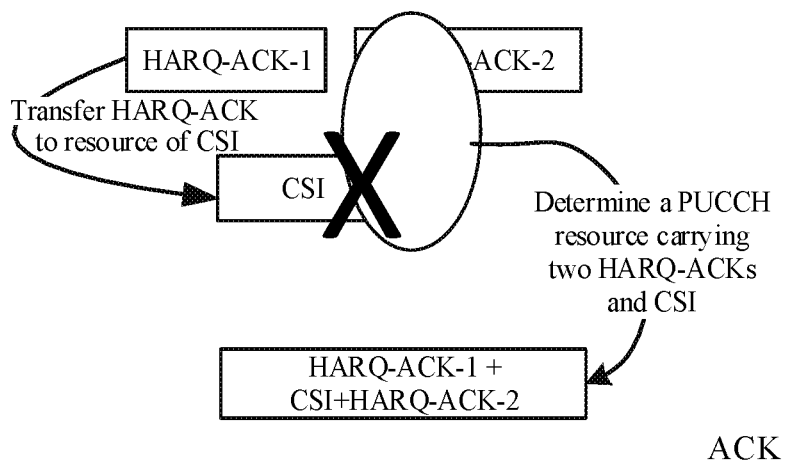
FIG. 7C is another schematic diagram of determining whether to drop CSI according to a multiplexing transmission rule in embodiments of the disclosure.

In a second example, based on the case of FIG. 5A, it is assumed that, the HARQ-ACK carried on the PUCCH carrying HARQ-ACK-1 is an HARQ-ACK of an SPS PDSCH (called SPS HARQ-ACK, SPS AN for short), the PUCCH format 0 or 1 is used, according to the existing multiplexing transmission rule of overlapping of the plurality of channels, the channel A whose start time is earliest is determined, namely the PUCCH carrying the HARQ-ACK, the channel set X overlapping with the channel A is determined as the PUCCH carrying the CSI, and then according to the multiplexing rule, HARQ-ACK-1 can be transferred onto a CSI resource to be simultaneously transmitted together with the CSI. That is, the resource carrying the HARQ-ACK-1 and the CSI for simultaneous transmission is determined as the PUCCH of the CSI. As this resource overlaps with the resource of the other HARQ-ACK (namely HARQ-ACK-2), according to the multiplexing rule, it is determined that the plurality of TDM HARQ-ACKs need to be transmitted on the same PUCCH (for example, the multiplexing rule is specifically that if the PUCCH of the second HARQ-ACK uses the PUCCH format 2 or 3 or 4, the PUCCH resource needs to be determined according to a total quantity of bits of the first HARQ-ACK, the CSI and the second HARQ-ACK to simultaneously transmit the first HARQ-ACK, the CSI and the second HARQ-ACK, as shown in FIG. 7C, and if the second HARQ-ACK is SPS HARQ-ACK, it also needs to be transferred onto the CSI resource for transmission, as shown in FIG. 7D), the CSI is dropped, and as there is no overlapping of the CSI and the HARQ-ACKs after the CSI is dropped, the two HARQ-ACKs can be independently transmitted on their own resources.

Figure 7D:
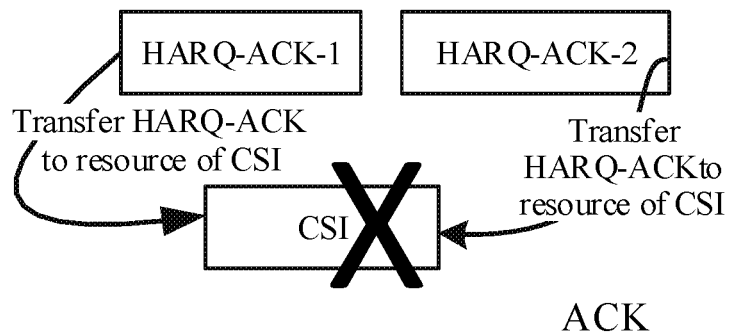
FIG. 7D is another schematic diagram of determining whether to drop CSI according to a multiplexing transmission rule in embodiments of the disclosure.
Figure 7E:
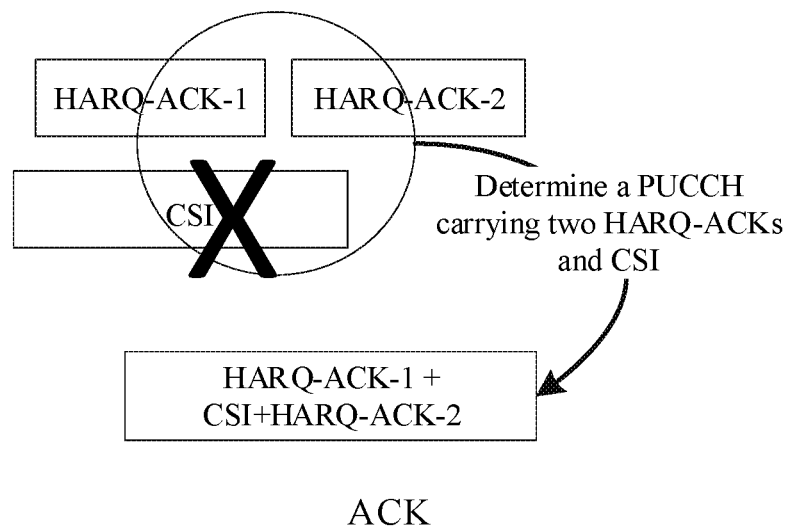
FIG. 7E is another schematic diagram of determining whether to drop CSI according to a multiplexing transmission rule in embodiments of the disclosure.

In a third example, based on the case of FIG. 5B, according to the multiplexing transmission rule, the channel A whose start position is earliest is determined as the PUCCH carrying the CSI, the channel set X overlapping with the channel A is determined as the PUCCH resource carrying HARQ-ACK-1 and the PUCCH resource carrying HARQ-ACK-2, a resource needs to be determined for simultaneously transmitting HARQ-ACK-1, HARQ-ACK-2 and the CSI, that is, it is determined that the plurality of TDM HARQ-ACKs need to be transmitted on the same PUCCH according to the multiplexing transmission rule (for example, the multiplexing transmission rule is specifically that when one HARQ-ACK uses the PUCCH format 2 or 3 or 4, the PUCCH resource needs to be determined according to a total quantity of bits of HARQ-ACK-1, the CSI and HARQ-ACK-2 to simultaneously transmit HARQ-ACK-1, the CSI and HARQ-ACK-2, as shown in FIG. 7E; and when the two HARQ-ACKs use the PUCCH format 0 or 1, for example, the both are SPS HARQ-ACKs, it is determined that the two HARQ-ACKs are transferred onto the CSI resource for transmission, as shown in FIG. 7D), then the CSI is dropped, and as there is no overlapping of the CSI and the HARQ-ACKs after the CSI is dropped, the two HARQ-ACKs can be independently transmitted on their own resources.

A Second Determining Manner

Figure 8:
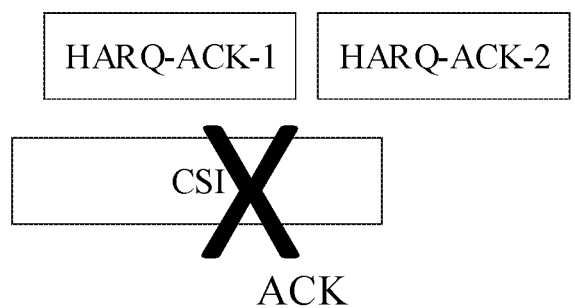
FIG. 8 is another schematic diagram of dropping CSI in embodiments of the disclosure.

The terminal device drops the CSI if it is determined that the PUCCH carrying the first HARQ-ACK and the CSI overlaps, in the time domain, with the PUCCH carrying the second HARQ-ACK, when the first PUCCH carrying the CSI overlaps, in the time domain, with the plurality of second PUCCHs carrying the HARQ-ACKs and not overlapping with each other in time domain, as shown in FIG. 8.

The first HARQ-ACK and the second HARQ-ACK are HARQ-ACKs carried on two different second PUCCHs respectively among the plurality of second PUCCHs.

In a first example, based on the case of FIG. 5A, it is assumed that, the PUCCH carrying HARQ-ACK-1 uses the PUCCH format 2 or 3 or 4. According to the existing multiplexing transmission rule of overlapping of the plurality of channels, the channel A whose start time is earliest, namely the PUCCH carrying HARQ-ACK-1 is determined, the channel set X overlapping with the channel A is determined as the PUCCH carrying the CSI, then according to the multiplexing transmission rule, the PUCCH resource set is determined according to a total quantity of bits of HARQ-ACK-1 and the CSI, and the PUCCH resource is determined in the determined PUCCH resource set according to the PUCCH resource indication field in DCI to which HARQ-ACK-1 corresponds to carry HARQ-ACK-1 and the CSI for simultaneous transmission.

Figure 9A:
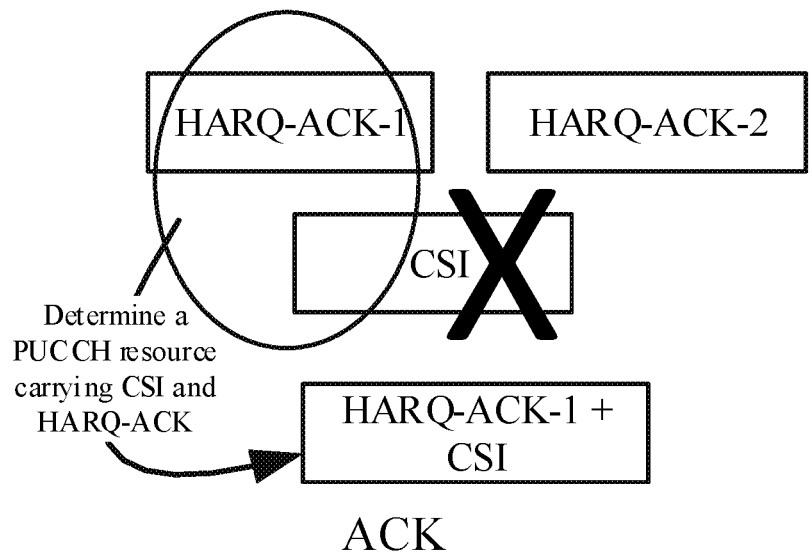
FIG. 9A is another schematic diagram of determining whether to drop CSI according to a multiplexing transmission rule in embodiments of the disclosure.

1) If the determined multiplexing resource overlaps, in the time domain, with that of HARQ-ACK-2, as shown in FIG. 9A, i.e., the PUCCH resource carrying a certain HARQ-ACK and the CSI determined according to the multiplexing transmission rule will overlap, in the time domain, with another PUCCH resource carrying the HARQ-ACK, the CSI is dropped, and as there is no overlapping of the CSI and the HARQ-ACKs after the CSI is dropped, the two HARQ-ACKs can be independently transmitted on their own resources.

Figure 9B:
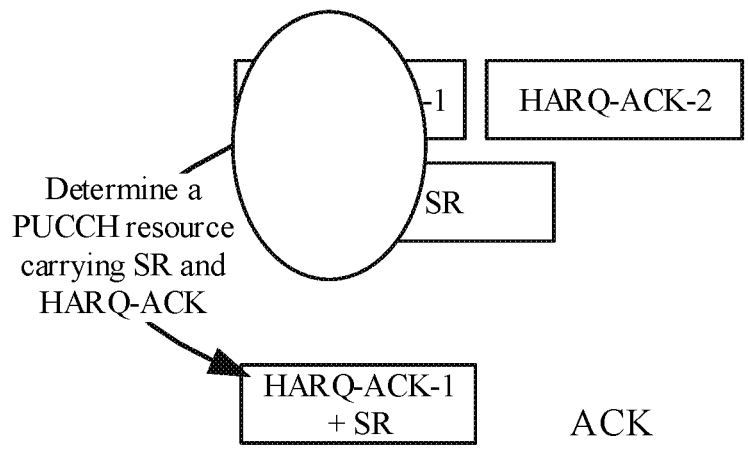
FIG. 9B is another schematic diagram of determining whether to drop CSI according to a multiplexing transmission rule in embodiments of the disclosure.

2) If the determined multiplexing resource does not overlap, in the time domain, with that of HARQ-ACK-2, as shown in FIG. 9B, the HARQ-ACK-1 and the CSI are simultaneously transmitted on this resource, and HARQ-ACK-2 is directly transmitted on the PUCCH of HARQ-ACK-2.

Figure 9C:
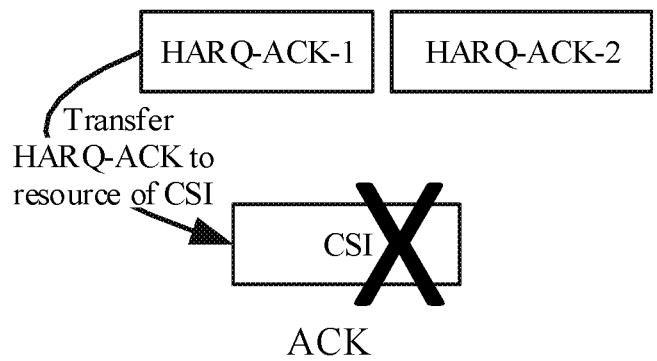
FIG. 9C is another schematic diagram of determining whether to drop CSI according to a multiplexing transmission rule in embodiments of the disclosure.

In a second example, based on the case of FIG. 5A, it is assumed that, an HARQ-ACK carried on the PUCCH carrying HARQ-ACK-1 is the HARQ-ACK of the SPS PDSCH (called SPS HARQ-ACK for short), the PUCCH format 0 or 1 is used, according to the existing multiplexing transmission rule of overlapping of the plurality of channels, the channel A whose start time is earliest is determined, namely the PUCCH carrying HARQ-ACK-1 is determined, the channel set X overlapping with the channel A is determined as the PUCCH carrying the CSI, and then according to the multiplexing rule, HARQ-ACK-1 can be transferred onto the CSI resource to be simultaneously transmitted together with the CSI, that is, it is determined that the resource carrying HARQ-ACK-1 and the CSI for simultaneous transmission is the PUCCH of the CSI. As this resource overlaps with the resource of the other HARQ-ACK (namely HARQ-ACK-2), the CSI is dropped. As there is no overlapping of the CSI and the HARQ-ACKs after the CSI is dropped, the two HARQ-ACKs can be independently transmitted on their own resources, as shown in FIG. 9C.

A Third Determining Manner

The terminal device drops the CSI if the start position of the first PUCCH carrying the CSI is earliest when the first PUCCH carrying the CSI overlaps, in the time domain, with the plurality of second PUCCHs carrying the HARQ-ACKs and not overlapping with each other in time domain, as shown in FIG. 5B.

A Fourth Determining Manner

The terminal device drops the CSI if the HARQ-ACKs carried by the plurality of second PUCCHs are all HARQ-ACKs of the SPS PDSCHs (that is, there is no corresponding PDCCH, and a PUCCH resource with a large capacity can be obtained through the PUCCH resource indication field in PDCCHs), or the HARQ-ACKs carried by the plurality of second PUCCHs are all HARQ-ACKs which are not transmitted in the PUCCH format 2 or 3 or 4 when the first PUCCH carrying the CSI overlaps, in the time domain, with the plurality of second PUCCHs carrying the HARQ-ACKs and not overlapping with each other in time domain.

As shown in cases of FIG. 5A or FIG. 5B, it is assumed that, HARQ-ACK-1 and HARQ-ACK-2 are both the SPS HARQ-ACKs, drop of CSI can be directly determined (as a resource of the PUCCH format 2 or 3 or 4 to which the HARQ-ACKs correspond cannot be provided for simultaneously transmitting the HARQ-ACKs and the CSI in this case, thus the HARQ-ACKs can only be transmitted via the resource of the CSI, and consequently multiplexing transmission of the plurality of HARQ-ACKs is caused), and as there is no overlapping of the CSI and the HARQ-ACKs after the CSI is dropped, the two HARQ-ACKs can be independently transmitted on their own resources. It is assumed that, the first HARQ-ACK (namely HARQ-ACK-1, or the second HARQ-ACK of course) is feedback information of a PDSCH with corresponding PDCCH scheduling or feedback information of a PDCCH indicating a downlink SPS resource release, it is indicated that the first HARQ-ACK has corresponding DCI (namely the above PDCCH). Thus it is possible that a multiplexing transmission resource for simultaneously transmitting the HARQ-ACK and the CSI can be determined according to the PUCCH resource indication field in the DCI and a total quantity of bits of the HARQ-ACKs and the CSI, which at the moment, needs to be determined according to the methods in the first example (the case in FIG. 5A) and the third example (the case in FIG. 5B).

The four possible preset dropping conditions are described through the above four determining manners, that is, the terminal device can finally choose to drop the first UCI (for example, the CSI) in the above four described determining manners, a transmission conflict between the HARQ-ACK and the first UCI can be avoided through the dropping mode, and it can be guaranteed that each HARQ- ACK can be subjected to information transmission independently on its own configured PUCCH resource, effectiveness of HARQ-ACK transmission is guaranteed to the greatest extent, and reliability of a communication system is improved. Meanwhile, as for the case of not dropping the first UCI, a multiplexing transmission mode among a plurality of UCI is also given.

In example 1, the solution is also suitable for a scenario in which the first UCI being the CSI is replaced by the first UCI being an HARQ-ACK whose priority is lower than that of the HARQ-ACK carried on the second PUCCH, and the first UCI is transmitted in a format of the PUCCH format 2 or 3 or 4 or the quantity of bits of the first UCI is larger than 2, a specific process may refer to the above introduction by taking the first UCI being the CSI for understanding and will not be repeated for the sake of concise description. The terminal device can avoid the transmission conflict between the plurality of HARQ-ACKs of different priority levels through the dropping mode, and it can be guaranteed that a higher-priority HARQ-ACK transmitted on the second PUCCH can be subjected to information transmission independently on its own configured PUCCH resource, and effectiveness of HARQ-ACK transmission is guaranteed.

Example 2

Figure 10A:
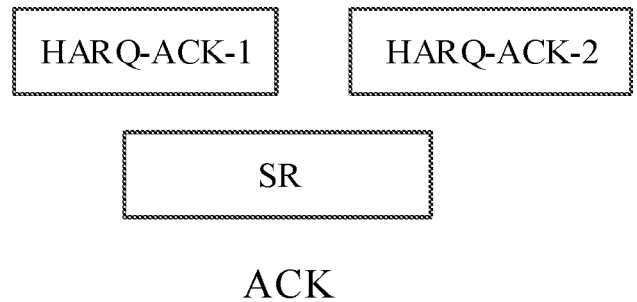
FIG. 10A is a schematic diagram that two PUCCHs carrying two HARQ-ACKs and not overlapping in a time domain, overlap in the time domain with a PUCCH carrying an SR in embodiments of the disclosure.
Figure 10B:
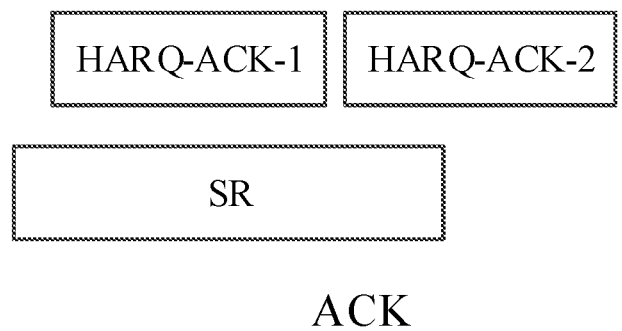
FIG. 10B is another schematic diagram that two PUCCHs carrying two HARQ-ACKs and not overlapping in a time domain, overlap in the time domain with a PUCCH carrying an SR in embodiments of the disclosure.

In example 2, that is, the first PUCCH carrying the first UCI overlaps, in the time domain, with a plurality of second PUCCHs carrying HARQ-ACKs and not overlapping with each other in time domain, for example, two second PUCCHs carrying the HARQ-ACKs overlap with a PUCCH resource carrying an SR, for example, as shown in FIG. 10A to FIG. 10B.

In embodiments of the disclosure, as described above, the plurality of second PUCCHs used for carrying the plurality of HARQ-ACKs are located in one slot and do not overlap with each other, for example, respectively located in different sub-slots in the slot. The first PUCCH carrying the SR and the plurality of second PUCCHs carrying the plurality of HARQ-ACKs are located in the same slot, and the plurality of second PUCCHs and the first PUCCH overlap in the time domain. That is, each of the second PUCCHs overlaps with the first PUCCH in the time domain. The sub-slot is a time device of a fixed symbol quantity in an appointed or configured slot. A sequence of the sub-slots in the slot, a position of each sub-slot and the quantity of symbols contained in the sub-slots are appointed or configured in advance. The quantities of the symbols contained in the different sub-slots in the slot are the same or different. That is, the quantity of symbols contained in each sub-slot contained in the same slot may be the same, for example, 7 or 2 symbols. Of course, the quantity of symbols contained in each sub-slot may be different, for example, a first sub-slot includes 4 symbols, a second sub-slot includes 3 symbols, and the specific quantity of symbols may be appointed or configured in advance.

Referring to FIG. 10A to FIG. 10B, in which taking the first UCI being the SR for example, a case of overlapping, in the time domain, of PUCCH resources used for carrying the two HARQ-ACKs with a PUCCH resource used for carrying the SR is illustrated. In FIG. 10A, the two PUCCHs used for carrying HARQ-ACK-1 and HARQ-ACK-2 each partially overlap with the PUCCH carrying the SR. In FIG. 10B, the PUCCH carrying HARQ-ACK-1 completely overlaps with the PUCCH carrying the SR, and the PUCCH carrying HARQ-ACK-2 partially overlaps with the PUCCH carrying the SR.

Figure 11:
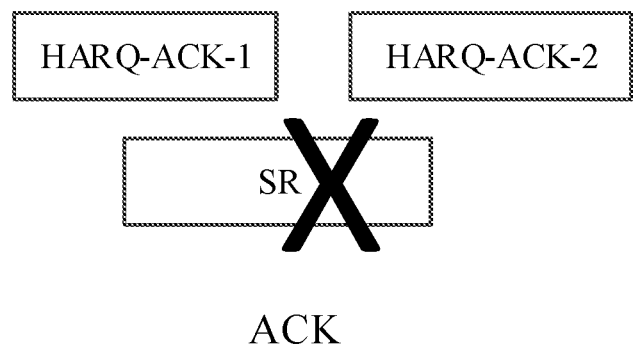
FIG. 11 is a schematic diagram of dropping an SR in embodiments of the disclosure.

That is, the terminal device can directly drop the SR when the first PUCCH carrying the SR overlaps, in the time domain, with the plurality of second PUCCHs carrying the plurality of HARQ-ACKs and not overlapping with each other in the time domain, as shown in FIG. 11, and overlapping of the SR and the HARQ-ACK can be avoided. After dropping the SR, the terminal device can transmit the HARQ-ACKs on the PUCCH resources to which the HARQ-ACKs correspond, that is, the corresponding HARQ-ACKs can be independently transmitted on the PUCCH resources configured originally for each of the HARQ-ACKs. That is, the corresponding HARQ-ACK can be transmitted on each second PUCCH, and thus it can be guaranteed that the HARQ-ACKs can be transmitted effectively and timely.

In embodiments of the disclosure, when the first PUCCH carrying the SR overlaps, in the time domain, with the plurality of second PUCCHs carrying the HARQ-ACKs and not overlapping with each other in time domain, the terminal device can further determine whether a preset dropping condition is met, if the preset dropping condition is met, the terminal device drops the SR; if the preset dropping condition is not met, the terminal device does not drop the SR, that is, the preset dropping condition can be used as a judgment basis of whether the SR is finally dropped.

Some possible cases of the preset dropping condition will be described below with reference to the drawings, that is, the terminal device can determine whether the SR is dropped in the following determining manners.

A First Determining Manner.

When the first PUCCH carrying the SR overlaps, in the time domain, with the plurality of second PUCCHs carrying the HARQ-ACKs and not overlapping with each other in time domain, the terminal device drops the SR, if it is determined that the plurality of HARQ-ACKs need to be transmitted simultaneously on the same PUCCH.

In a specific implementation process, whether the plurality of HARQ-ACKs need to be transmitted simultaneously on the same PUCCH can be determined by using the existing multiplexing transmission rule, which is specifically described as follows.

In a first example, based on the case of FIG. 10A, it is assumed that, a PUCCH of a first HARQ-ACK (namely HARQ-ACK-1) uses the PUCCH format 2 or 3 or 4, according to the existing multiplexing transmission rule of overlapping of a plurality of channels, a channel A whose start time is earliest is determined, namely the PUCCH carrying HARQ-ACK-1 is determined, and a channel set X overlapping with the channel A is determined as the PUCCH carrying the SR. A PUCCH resource set is determined according to a total quantity of bits of the HARQ-ACK-1 and the SR depending on the multiplexing rule, and a PUCCH resource is determined in the determined PUCCH resource set according to a PUCCH resource indication field in DCI to which the HARQ-ACK-1 corresponds to carry the HARQ-ACK-1 and the SR for simultaneous transmission. The resource is continuously used to replace the resource A and the set X, and the above multiplexing transmission rule is further repeated for the overlapping channels.

Figure 12A:
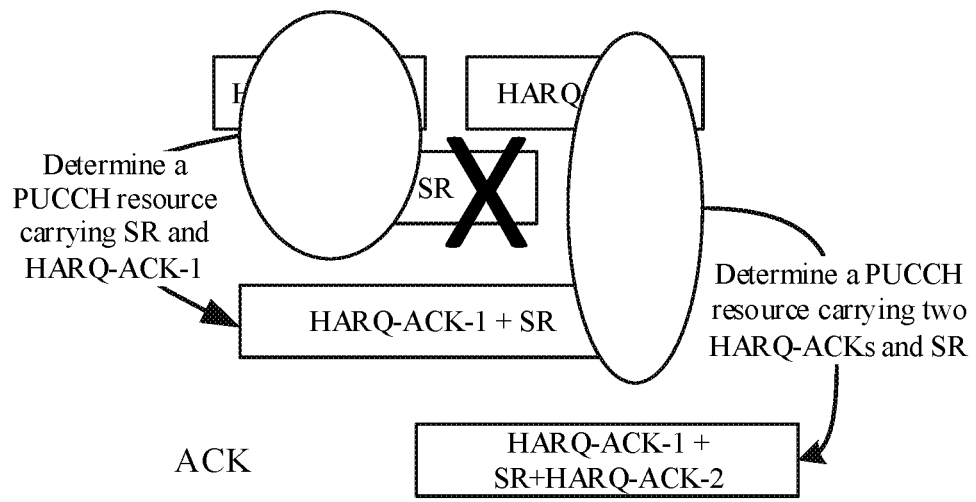
FIG. 12A is a schematic diagram of determining whether to drop an SR according to a multiplexing transmission rule in embodiments of the disclosure.

1) If the determined multiplexing resource overlaps, in the time domain, with another HARQ-ACK (for example, HARQ-ACK-2 in FIG. 10A), as shown in FIG. 12A, according to the multiplexing transmission rule, at the moment, the resource A is determined as the PUCCH resource carrying the first HARQ-ACK (namely HARQ-ACK-1) and the SR, the set X overlapping with the resource A is determined as the PUCCH of second HARQ-ACK (namely HARQ-ACK- 2). Then according to the multiplexing transmission rule, a PUCCH resource needs to be found according to a total quantity of bits of the first HARQ-ACK, the SR and the second HARQ-ACK to simultaneously transmit the first HARQ-ACK, the SR and the second HARQ-ACK (a detail step of determining this resource is similar to the above step, the PUCCH resource set is determined according to the total quantity of bits, and the PUCCH resource is determined according to the PUCCH resource indication field in the DCI to which the HARQ-ACK corresponds). That is, the SR is dropped when it is determined that the plurality of TDM HARQ-ACKs need to be transmitted on the same PUCCH according to the multiplexing transmission rule, and as there is no overlapping of the SR and the HARQ-ACKs after the SR is dropped, the two HARQ-ACKs can be independently transmitted on their own resources.

Figure 12B:
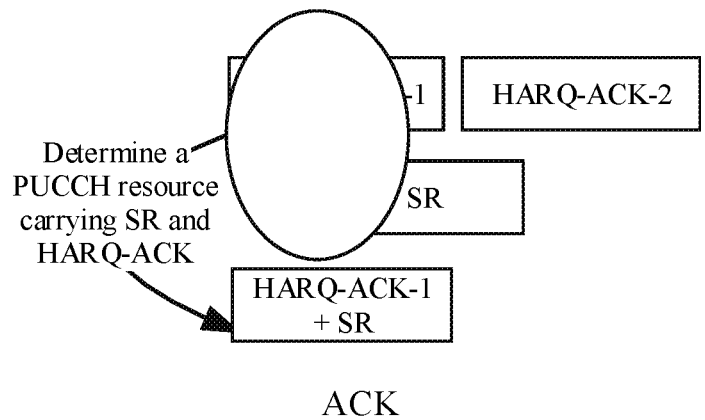
FIG. 12B is another schematic diagram of determining whether to drop an SR according to a multiplexing transmission rule in embodiments of the disclosure.

2) If the determined multiplexing resource does not overlap with the HARQ-ACK-2 in the time domain, as shown in FIG. 12B, the HARQ-ACK-1 and the SR are simultaneously transmitted on this multiplexing resource, and HARQ-ACK-2 is directly transmitted on the PUCCH of the HARQ-ACK-2.

Figure 12C:
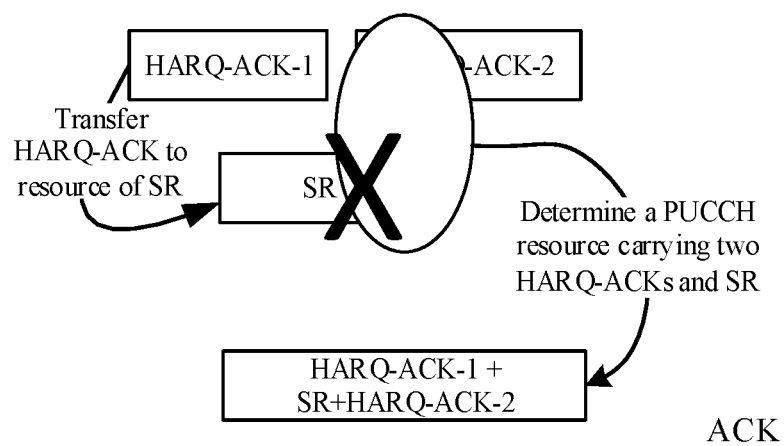
FIG. 12C is another schematic diagram of determining whether to drop an SR according to a multiplexing transmission rule in embodiments of the disclosure.
Figure 12D:
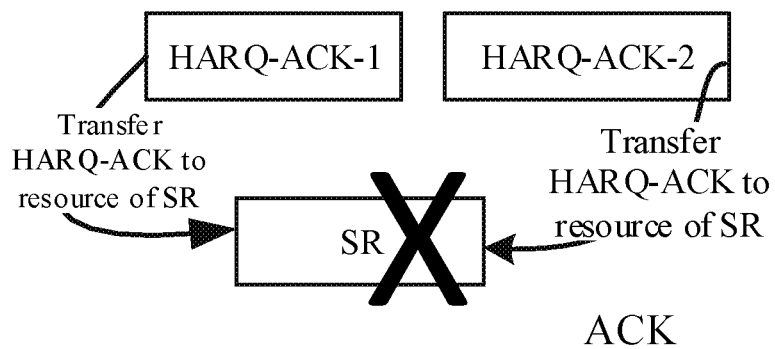
FIG. 12D is another schematic diagram of determining whether to drop an SR according to a multiplexing transmission rule in embodiments of the disclosure.

In a second example, based on the case of FIG. 10A, it is assumed that, the PUCCH carrying HARQ-ACK-1 uses the PUCCH format 1, the SR is a positive SR, the PUCCH carrying the SR uses the PUCCH format 1, according to the existing multiplexing transmission rule of overlapping of the plurality of channels, the channel A whose start time is earliest is determined, namely the PUCCH carrying the HARQ-ACK-1 is determined, the channel set X overlapping with the channel A is determined as the PUCCH carrying the SR. Then according to the multiplexing rule, HARQ-ACK-1 can be transferred onto an SR resource to be simultaneously transmitted together with the SR, and it is implicitly expressed that there is SR transmission at the same time by using the SR resource for transmitting the HARQ-ACK. That is, the resource carrying the HARQ-ACK-1 and the SR for simultaneous transmission is determined as the PUCCH of the SR. As this resource overlaps with the resource of the other HARQ-ACK (namely HARQ-ACK-2), according to the multiplexing rule, it is determined that the plurality of TDM HARQ-ACKs need to be transmitted on the same PUCCH (for example, the multiplexing rule is specifically that if the PUCCH of the second HARQ-ACK uses the PUCCH format 2 or 3 or 4, the PUCCH resource needs to be determined according to a total quantity of bits of the first HARQ-ACK, the SR and the second HARQ-ACK to simultaneously transmit the first HARQ-ACK, the SR and the second HARQ-ACK, as shown in FIG. 12C, and if the PUCCH of the second HARQ-ACK uses the PUCCH format 1, the second HARQ-ACK is transferred onto the SR resource to be transmitted, as shown in FIG. 12D), then the SR is dropped, and as there is no overlapping of the SR and the HARQ-ACKs after the SR is dropped, the two HARQ-ACKs can be independently transmitted on their own resources.

Figure 12E:
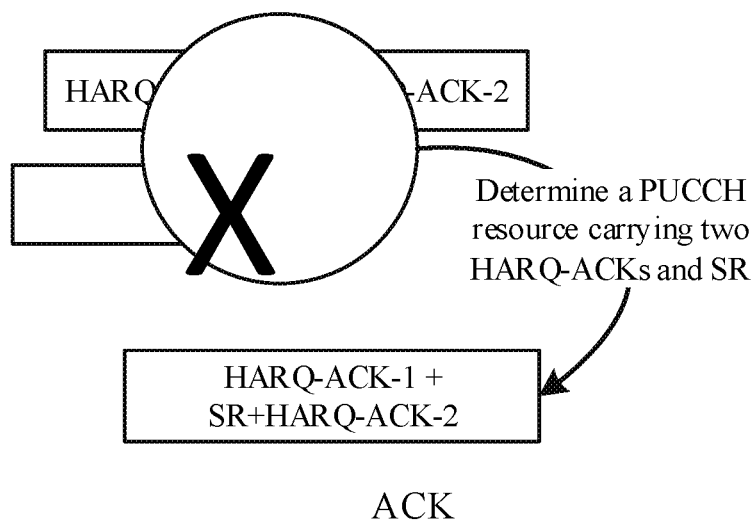
FIG. 12E is another schematic diagram of determining whether to drop an SR according to a multiplexing transmission rule in embodiments of the disclosure

In a third example, based on the case of FIG. 10B, according to the multiplexing transmission rule, the channel A whose start position is earliest is determined as the PUCCH carrying the SR, the channel set X overlapping with the channel A is determined as the PUCCH resource carrying HARQ-ACK-1 and the PUCCH resource carrying HARQ-ACK-2, a resource needs to be determined for simultaneously transmitting HARQ-ACK-1, HARQ-ACK-2 and the SR. That is, it is determined that the plurality of TDM HARQ-ACKs need to be transmitted on the same PUCCH according to the multiplexing transmission rule (for example, the multiplexing transmission rule is specifically that when one HARQ-ACK uses the PUCCH format 2 or 3 or 4, the PUCCH resource needs to be determined according to a total quantity of bits of HARQ-ACK-1, the SR and HARQ-ACK-2 to simultaneously transmit HARQ-ACK-1, the SR and HARQ-ACK-2, as shown in FIG. 12E, and when the two HARQ-ACKs use the PUCCH format 1, it is determined that the two HARQ-ACKs are transferred onto the SR resource to be transmitted, as shown in FIG. 12D), then the SR is dropped, and as there is no overlapping of the SR and the HARQ-ACKs after the SR is dropped, the two HARQ-ACKs can be independently transmitted on their own resources.

A Second Determining Manner

Figure 13:
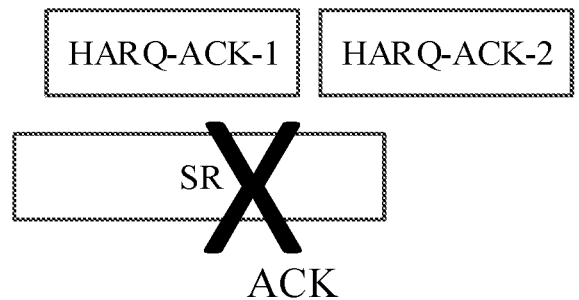
FIG. 13 is another schematic diagram of dropping an SR in embodiments of the disclosure.

When the first PUCCH carrying the SR overlaps, in the time domain, with the plurality of second PUCCHs carrying the HARQ-ACKs and not overlapping with each other in time domain, the terminal device drops the SR if it is determined that the PUCCH carrying the first HARQ-ACK and the SR overlaps, in the time domain, with the PUCCH carrying the second HARQ-ACK, as shown in FIG. 13.

The first HARQ-ACK and the second HARQ-ACK are HARQ-ACKs carried on two different second PUCCHs respectively among the plurality of second PUCCHs.

In a first example, based on the case of FIG. 10A, it is assumed that, the PUCCH carrying HARQ-ACK-1 uses the PUCCH format 2 or 3 or 4, according to the existing multiplexing transmission rule of overlapping of the plurality of channels, the channel A whose start time is earliest is determined, namely the PUCCH carrying HARQ-ACK-1 is determined, the channel set X overlapping with the channel A is determined as the PUCCH carrying the CSI. Then according to the multiplexing transmission rule, the PUCCH resource set is determined according to a total quantity of bits of HARQ-ACK-1 and the CSI, and the PUCCH resource is determined in the determined PUCCH resource set according to the PUCCH resource indication field in DCI to which HARQ-ACK-1 corresponds to carry HARQ-ACK-1 and the SR for simultaneous transmission.

Figure 14A:
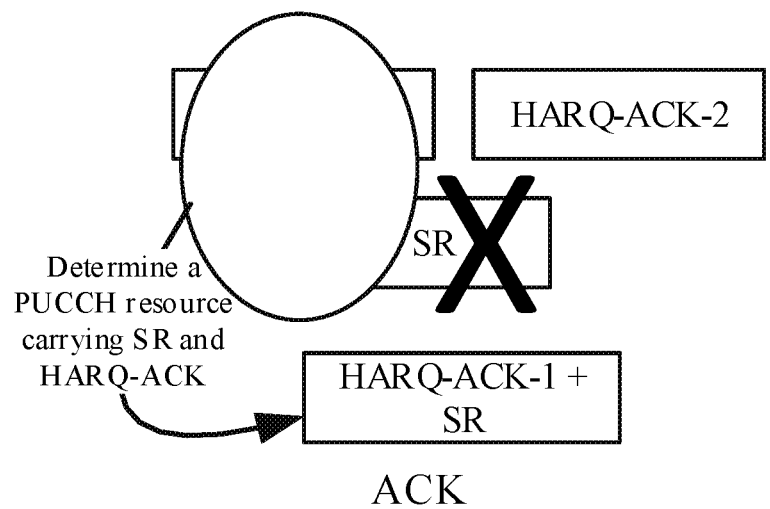
FIG. 14A is another schematic diagram of determining whether to drop an SR according to a multiplexing transmission rule in embodiments of the disclosure.

1) If the determined multiplexing resource overlaps, in the time domain, with HARQ-ACK-2, as shown in FIG. 14A, the PUCCH resource carrying a HARQ-ACK and the SR determined according to the multiplexing transmission rule will overlap, in the time domain, with another PUCCH resource carrying the HARQ-ACK, the SR is dropped, and as there is no overlapping of the SR and the HARQ-ACKs after the SR is dropped, the two HARQ-ACKs can be independently transmitted on their own resources.

Figure 14B:
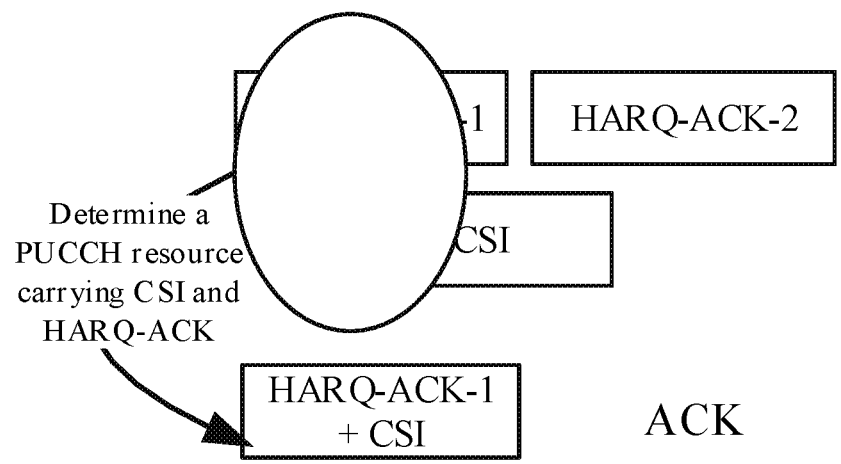
FIG. 14B is another schematic diagram of determining whether to drop an SR according to a multiplexing transmission rule in embodiments of the disclosure.

2) If the determined multiplexing resource does not overlap, in the time domain, with HARQ-ACK-2, as shown in FIG. 14B, the HARQ-ACK-1 and the SR are simultaneously transmitted on this resource, and HARQ-ACK-2 is directly transmitted on the PUCCH of HARQ-ACK-2.

Figure 14C:
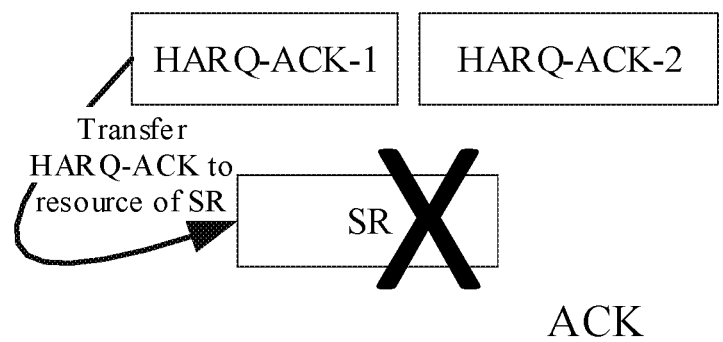
FIG. 14C is another schematic diagram of determining whether to drop an SR according to a multiplexing transmission rule in embodiments of the disclosure.

In a second example, based on the case of FIG. 10A, it is assumed that, the PUCCH carrying HARQ-ACK-1 uses the PUCCH format 1, the SR uses the PUCCH format 1, and the SR is a positive SR, according to the existing multiplexing transmission rule of overlapping of the plurality of channels, the channel A whose start time is earliest is determined, namely the PUCCH carrying HARQ-ACK-1 is determined, the channel set X overlapping with the channel A is determined as the PUCCH carrying the SR, then according to the multiplexing rule, HARQ-ACK-1 can be transferred onto the SR resource to be simultaneously transmitted together with the SR, and it is implicitly expressed that there is SR transmission at the same time by using the SR resource for transmitting the HARQ-ACK, that is, it is determined that the resource carrying HARQ-ACK-1 and the SR for simultaneous transmission is the PUCCH of the SR. As this resource overlaps with the resource of the other HARQ-ACK (namely HARQ-ACK-2), the SR is dropped. As there is no overlapping of the SR and the HARQ-ACKs after the SR is dropped, the two HARQ-ACKs can be independently transmitted on their own resources, as shown in FIG. 14C.

A Third Determining Manner

The terminal device drops the SR if the start position of the first PUCCH carrying the SR is earliest when the first PUCCH carrying the SR overlaps, in the time domain, with the plurality of second PUCCHs carrying the HARQ-ACKs and not overlapping with each other in time domain, as shown in FIG. 12B.

A Fourth Determining Manner

The terminal device drops the SR if the SR is positive (that is, a positive SR, in spite of whether the SR is transmitted in the PUCCH format 0 or the PUCCH format 1) and the plurality of second PUCCHs use the PUCCH format 1 for transmitting the HARQ-ACKs when the first PUCCH carrying the SR overlaps, in the time domain, with the plurality of second PUCCHs carrying the HARQ-ACKs and not overlapping with each other in time domain, as in this case, the PUCCH format 1 cannot support simultaneous transmission of the SR and the HARQ-ACKs (when the SR uses the PUCCH format 0, if a start position of the SR lags behind the first HARQ-ACK, according to the multiplexing rule, the SR and the first HARQ-ACK are multiplexed, at the moment, the HARQ-ACKs use the PUCCH format 1 which does not support this multiplexing transmission, when the SR uses the PUCCH format 1, the SR overlaps with the two HARQ-ACKs at the same time, causing that the two HARQ-ACKs need to be transmitted on the resource of the PUCCH format 1 of the SR, while the PUCCH format 1 does not support this transmission).

The four possible preset dropping conditions are described through the above four determining manners, that is, the terminal device can finally choose to drop the first UCI (for example, the SR) in the above four described determining manners, a transmission conflict between the HARQ-ACK and the first UCI can be avoided through the dropping mode, and it can be guaranteed that each HARQ-ACK can be subjected to information transmission independently on its own configured PUCCH resource, effectiveness of HARQ-ACK transmission is guaranteed to the greatest extent, and reliability of a communication system is improved. Meanwhile, as for the case of not dropping the first UCI, a multiplexing transmission mode among a plurality of UCI is also given.

In example 2, it is also suitable to a scenario where the first UCI being the SR is replaced by the first UCI being an HARQ-ACK whose priority is lower than that of the HARQ-ACK carried on the second PUCCH, and it is assumed that the first UCI is transmitted in a format of the PUCCH format 0 or 1, or the quantity of bits of the first UCI does not exceed 2, a specific process may refer to the above introduction by taking the first UCI being the SR for understanding and will not be repeated for the sake of concise description. The terminal device can avoid the transmission conflict between the plurality of HARQ-ACKs of different priority levels through the dropping mode, and it can be guaranteed that a higher-priority HARQ-ACK transmitted on the second PUCCH can be subjected to information transmission independently on its own configured PUCCH resource, and effectiveness of HARQ-ACK transmission is guaranteed.

Example 3

In example 3, description is made for an overlapping case that a first PUCCH carrying first UCI overlaps in a time domain with a second PUCCH carrying a first HARQ-ACK, and a third PUCCH carrying the first HARQ-ACK and the first UCI overlaps in the time domain with a fourth PUCCH carrying a second HARQ-ACK. For example, a PUCCH carrying an HARQ-ACK overlaps with a PUCCH resource carrying CSI and/or the SR, as shown in FIG. 15, in which "CSI/SR" represents CSI and/or SR, and "CSI/SR" in the following drawings are understood in the same understanding mode as "CSI/SR in FIG. 15".

Figure 15:
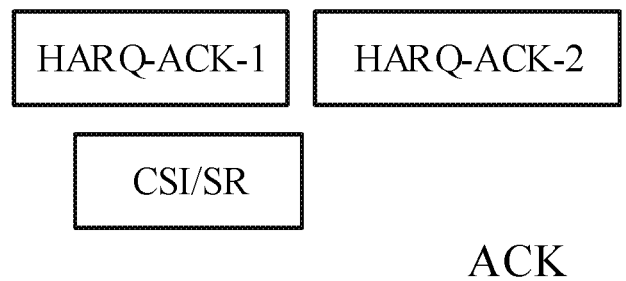
FIG. 15 is a schematic diagram that some PUCCHs among a plurality of PUCCHs carrying a plurality of HARQ-ACKS and not overlapping in a time domain, overlap in the time domain with a PUCCH carrying first UCI (namely CSI and/or SR), and some PUCCHs among the plurality of PUCCHs do not overlap with the PUCCH carrying the first UCI (namely the CSI and/or SR) in embodiments of the disclosure.

As shown in FIG. 15, HARQ-ACK-1 and HARQ-ACK-2 are transmitted in one slot, CSI/SR is/are also transmitted in the slot, and HARQ-ACK-1 overlaps with the CSI/SR in the time domain, and at the moment, HARQ-ACK-2 does not overlap with CSI/SR in the time domain.

It is assumed that, the PUCCH carrying the HARQ-ACK uses a PUCCH format 2 or 3 or 4, according to the existing multiplexing transmission rule of overlapping of resources of the HARQ-ACK and CSI/SR, a PUCCH resource set is determined according to a total quantity of bits of the HARQ-ACK and CSI/SR, a PUCCH resource is determined in the determined PUCCH resource set according to the PUCCH resource indication field in DCI to which the first HARQ-ACK (for example, HARQ-ACK-1, or HARQ-ACK-2 of course) corresponds to carry the first HARQ-ACK and the CSI/SR for simultaneous transmission.

Figure 16A:
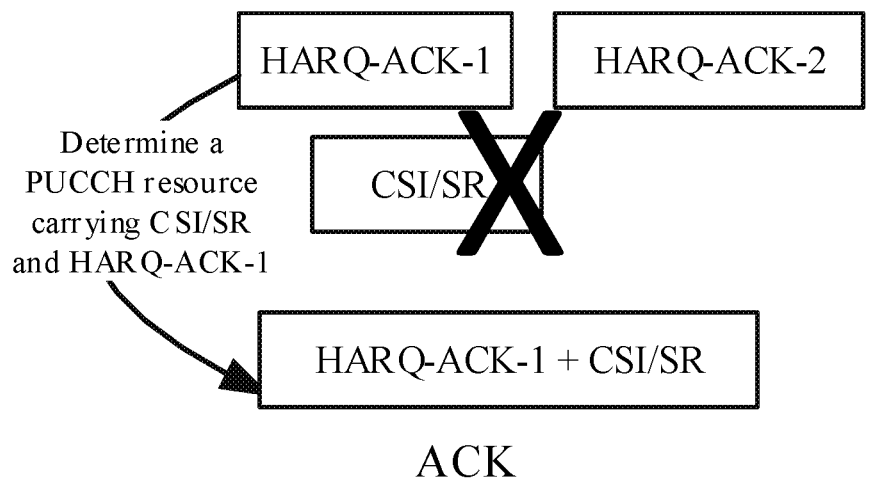
FIG. 16A is a schematic diagram of determining whether to drop first UCI (namely CSI and/or SR) according to a multiplexing transmission rule in embodiments of the disclosure.

1) If this resource overlaps, in the time domain, with the second HARQ-ACK (when the first HARQ-ACK is HARQ-ACK-1, the second HARQ-ACK is HARQ-ACK-2, and when the first HARQ-ACK is HARQ-ACK-2, the second HARQ-ACK is HARQ-ACK-1), as shown in FIG. 16A, then according to a multiplexing transmission rule, a PUCCH resource needs to be determined according to a total quantity of bits of the first HARQ-ACK, the CSI/SR and the second HARQ-ACK to simultaneously transmit the first HARQ-ACK, the CSI/SR and the second HARQ-ACK (a detail step of determining this resource is similar to the above step, that is, a PUCCH resource set is determined according to a total quantity of bits, and a PUCCH resource is determined according to a PUCCH resource indication field in DCI to which the HARQ-ACK corresponds), a condition is met that PUCCH resource carrying the HARQ-ACK and the CSI/SR will overlap, in the time domain, with another PUCCH resource carrying the HARQ-ACK, the CSI/SR is/are dropped, and as there is no overlapping of the CSI/SR and the first HARQ-ACK after the CSI/SR is/are dropped, the two HARQ-ACKs can be independently transmitted on their own resources, and effectiveness and timeliness of transmission of each HARQ-ACK are guaranteed.

Figure 16B:
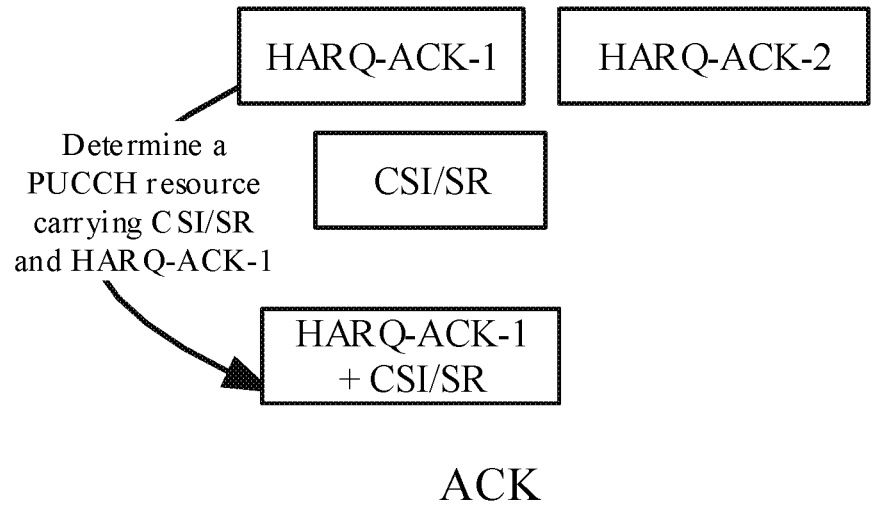
FIG. 16B is another schematic diagram of determining whether to drop first UCI (namely CSI and/or SR) according to a multiplexing transmission rule in embodiments of the disclosure.

2) If this resource does not overlap with the second HARQ-ACK in the time domain, as shown in FIG. 16B, the first HARQ-ACK and the CSI/SR can be simultaneously transmitted on this resource, and the second HARQ-ACK is directly transmitted on the PUCCH of the second HARQ-ACK.

In embodiments of the disclosure, when the PUCCH resource carrying the HARQ-ACK overlaps with the PUCCH resource used for carrying the CSI/SR, after a multiplexing PUCCH resource is selected for these UCI on the basis of the multiplexing transmission rule, the multiplexing PUCCH resource may need to simultaneously transmit a plurality of HARQ-ACKs on the same PUCCH, consequently, a resource conflict between the HARQ-ACKs is caused, that is, overlapping of the PUCCH resource carrying the HARQ-ACK with the PUCCH resource used for carrying the SR leads to a situation that the plurality of HARQ-ACKs which do not overlap originally need to be simultaneously transmitted on the same PUCCH, that is, overlapping of the PUCCH resource carrying the HARQ-ACK and the PUCCH resource used for carrying the CSI/SR leads to the resource conflict between the plurality of HARQ-ACKs, thus the CSI/SR can be dropped, and the plurality of HARQ-ACKs which do not overlap originally are prevented from being simultaneously transmitted on the same PUCCH resource, and effectiveness and timeliness of HARQ-ACK transmission are improved.

In embodiments of the disclosure, as the HARQ-ACK is a real-time feedback used for feeding, by the terminal device, whether downlink data are received successfully, back to the network device, once time delay of the HARQ-ACK transmission is affected, time delay of downlink transmission will be directly affected, once transmission performance of the HARQ-ACK is affected, downlink throughput will be directly affected, and many unnecessary re-transmissions are caused, so HARQ-ACK transmission is important. CSI and SR, for example, are some periodical reports or a scheduling request used for data scheduling, though a transmission opportunity is missed, there will be another transmission opportunity next time for continuing transmission, so when there is resource overlapping of the HARQ-ACK and the first UCI, transmission of the HARQ-ACK can be guaranteed preferentially while the first UCI can be dropped, in this way, it can be guaranteed that the HARQ-ACK can be transmitted to the network side timely and effectively, and timeliness of data interaction between a data terminal side and the network side is guaranteed to the greatest extent.

As shown in FIG. 17, another schematic flowchart to which an information transmission method corresponds provided by embodiments of the disclosure, the method can be executed by a network device (for example gNB) and specifically includes the following steps.

Step 171: the network device determines that a first PUCCH carrying first UCI overlaps, in a time domain, with each of a plurality of second PUCCHs carrying HARQ-ACKs and not overlapping with each other in time domain; or the network device determines that a third PUCCH carrying both of the first HARQ-ACK and the first UCI overlaps, in the time domain, with a fourth PUCCH carrying the second HARQ-ACK when the first PUCCH carrying the first UCI overlaps, in the time domain, with the second PUCCH carrying the first HARQ-ACK.

Step 172: the network device determines that the first UCI is dropped.

In a possible implementation, the first UCI in embodiments of the disclosure may be other types of UCI different from the HARQ-ACK, for example, the first UCI is an SR or CSI or contains both the CSI and the SR, that is, the first UCI is CSI and/or the SR. In another possible implementation, the first UCI in embodiments of the disclosure may be the HARQ-ACK, and the HARQ-ACK in the first UCI is an HARQ-ACK whose priority is lower than that of the HARQ-ACK carried on the second PUCCH.

In a possible implementation, the network device determines that the first UCI is dropped by the terminal device when it is determined that the first PUCCH carrying the first UCI overlaps, in the time domain, with the plurality of second PUCCHs carrying the HARQ-ACKs and not overlapping with each other in time domain and the plurality of HARQ-ACKs need to be simultaneously transmitted on the same PUCCH, for example, it is determined that the plurality of HARQ-ACKs need to be simultaneously transmitted on the same PUCCH on the basis of the multiplexing transmission rule.

In another possible implementation, the network device determines that the first UCI is dropped by the terminal device when it is determined that the first PUCCH carrying the first UCI overlaps, in the time domain, with the plurality of second PUCCH carrying the HARQ-ACKs which, in the time domain, do not overlap and the PUCCH carrying the first HARQ-ACK and the first UCI overlaps, in the time domain, with the PUCCH carrying the second HARQ-ACK. The first HARQ-ACK and the second HARQ-ACK are HARQ-ACKs carried on two different second PUCCHs among the plurality of second PUCCHs.

In another possible implementation, the network device determines that the first UCI is dropped by the terminal device when it is determined that the first PUCCH carrying the first UCI overlaps, in the time domain, with the plurality of second PUCCHs carrying the HARQ-ACKs and not overlapping with each other in time domain and a start position of the first PUCCH carrying the first UCI is earliest.

In another possible implementation, the network device determines that the first UCI is dropped by the terminal device when it is determined that the first PUCCH carrying the first UCI overlaps, in the time domain, with the plurality of second PUCCHs carrying the HARQ-ACKs and not overlapping with each other in time domain and if the first UCI is CSI and the HARQ-ACKs carried by the plurality of second PUCCHs are all HARQ-ACKs of corresponding SPS PDSCHs.

In another possible implementation, the network device determines that the first UCI is dropped by the terminal device when it is determined that the first PUCCH carrying the first UCI overlaps, in the time domain, with the plurality of second PUCCHs carrying the HARQ-ACKs and not overlapping with each other in time domain and if the first UCI is CSI and all the HARQ-ACKs carried by the plurality of second PUCCHs are not transmitted using any PUCCH format in the PUCCH format 2 or 3 or 4.

In another possible implementation, the network device determines that the first UCI is dropped by the terminal device when it is determined that the first PUCCH carrying the first UCI overlaps, in the time domain, with the plurality of second PUCCHs carrying the HARQ-ACKs and not overlapping with each other in time domain and if the first UCI is the SR or a positive SR or the HARQ-ACK and the plurality of second PUCCHs use the PUCCH format 1 for transmitting the HARQ-ACK.

In another possible implementation, the network device determines that the first UCI is dropped by the terminal device when it is determined that the first PUCCH carrying the first UCI overlaps, in the time domain, with the plurality of second PUCCHs carrying the HARQ-ACKs and not overlapping with each other in time domain and if the first UCI is an HARQ-ACK with more than 2 bits and the plurality of second PUCCHs use the PUCCH format 1 for transmitting the HARQ-ACK.

In another possible implementation, the network device determines that the first UCI is dropped by the terminal device when it is determined that the first PUCCH carrying the first UCI overlaps, in the time domain, with the plurality of second PUCCHs carrying the HARQ-ACKs and not overlapping with each other in time domain and if the plurality of HARQ-ACKs need to be simultaneously transmitted on the same PUCCH when the first UCI is the HARQ-ACK.

In another possible implementation, the network device determines that the first UCI is dropped by the terminal device when it is determined that the first PUCCH carrying the first UCI overlaps, in the time domain, with the plurality of second PUCCHs carrying the HARQ-ACKs and not overlapping with each other in time domain and if it is determined that the PUCCH carrying both of the first HARQ-ACK and the first UCI overlaps, in the time domain, with the PUCCH carrying the second HARQ-ACK when the first UCI is the HARQ-ACK, and the first HARQ-ACK and the second HARQ-ACK are HARQ-ACKs carried on two different second PUCCHs among the plurality of second PUCCHs.

In another possible implementation, the network device determines that the first UCI is dropped by the terminal device when it is determined that the first PUCCH carrying the first UCI overlaps, in the time domain, with the plurality of second PUCCHs carrying the HARQ-ACKs and not overlapping with each other in time domain and if the start position of the first PUCCH carrying the first UCI is earliest when the first UCI is the HARQ-ACK.

In embodiments of the disclosure, the network device can determine whether the terminal device finally drops the first UCI according to the above mode that the terminal device to which FIG. 3 corresponds determines whether the first UCI is dropped to determine how to receive related UCI. Therefore, a mode that the network device determines whether the first UCI is dropped may refer to the above described content of the terminal device side to which FIG. 3 corresponds and will not be described in detail here for the sake of concise description.

Based on the same inventive concept, embodiments of the disclosure provide a communication device. The communication device may be, for example, the terminal device introduced in the above embodiment, as shown in FIG. 18. The communication device in embodiments of the disclosure includes a memory 181 and a processor 182. The memory 181 is configured to store a program instruction, and the processor 182 is configured to call the program instruction stored in the memory 181 to execute according to an obtained program:

when a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACK does not overlap with each other in the time domain, dropping the first UCI;

or when the first PUCCH carrying the first UCI overlaps, in the time domain, with a second PUCCH carrying a first HARQ-ACK, dropping the first UCI, if it is determined that a third PUCCH carrying simultaneously the first HARQ-ACK and the first UCI overlaps, in the time domain, with a fourth PUCCH carrying a second HARQ-ACK;

and the first UCI is of an type of UCI other than the HARQ-ACK, or when the first UCI includes the HARQ-ACK, a priority of the HARQ-ACK in the first UCI is lower than a priority of the HARQ-ACK carried on the second PUCCH.

In a possible implementation, according to the obtained program, the processor 182 executes: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if it is determined that the plurality of HARQ-ACKs need to be transmitted simultaneously on a same PUCCH.

In a possible implementation, according to the obtained program, the processor 182 execute:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if it is determined that a PUCCH carrying simultaneously a first HARQ-ACK and the first UCI overlaps, in the time domain, with a PUCCH carrying a second HARQ-ACK; and the first HARQ-ACK and the second HARQ-ACK are HARQ-ACKs carried on two different second PUCCHs among the plurality of second PUCCHs.

In a possible implementation, according to the obtained program, the processor 182 executes: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if a start position of the first PUCCH carrying the first UCI is earliest.

In a possible implementation, according to the obtained program, the processor 182 executes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if the first UCI is channel state information, CSI, and the HARQ-ACKs carried by the plurality of second PUCCHs are HARQ-ACKs of semi-static scheduling, SPS, physical downlink shared channel, PDSCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI if the first UCI is the CSI and the HARQ-ACKs carried by the plurality of second PUCCHs are not transmitted using any PUCCH format among PUCCH format 2 or 3 or 4.

In a possible implementation, according to the obtained program, the processor 182 executes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if the first UCI is an SR or a positive SR or the HARQ-ACK and the plurality of second PUCCHs use a PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, dropping the first UCI, if the first UCI is an HARQ-ACK with more than 2 bits and the plurality of second PUCCHs use the PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, dropping the first UCI, if it is determined that the plurality of HARQ-ACKs need to be transmitted simultaneously on a same PUCCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, dropping the first UCI, if it is determined that the PUCCH carrying both of the first HARQ-ACK and the first UCI overlaps, in the time domain, with a PUCCH carrying the second HARQ-ACK, and the first HARQ-ACK and the second HARQ-ACK are HARQ-ACKs carried on two different second PUCCHS among the plurality of second PUCCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, dropping the first UCI, if a start position of the first PUCCH carrying the first UCI is earliest.

A transceiver 183 is configured to receive and transmit data under control of the processor 182.

In FIG. 18, a bus interface may include any quantity of interconnected buses and bridges, which specifically link various circuits of one or more processors represented by the processor 182 and memories represented by the memory 181. A bus architecture may further link various other circuits of a peripheral device, a voltage stabilizer, a power management circuit, etc., which is well known in the art and therefore, will not be further described herein. The bus interface provides an interface. The transceiver 183 may be a plurality of elements, that is, including a transmitter and a receiver, providing a device for communicating with various other apparatuses on a transmission medium. As for different communication devices, a user interface 184 may be also an interface capable of being externally or internally connected with required devices, and the connected devices include but are not limited to a keypad, a display, a speaker, a microphone, a joystick, etc.

The processor 182 is in charge of managing the bus architecture and general processing, and the memory 181 may store data used by the processor 182 when executing an operation.

In one embodiment, the processor 182 may be a central processing unit (CPU), an application specific integrated circuit (ASIC), a field-programmable gate array (FPGA) or a complex programmable logic device (CPLD).

Figure 19:
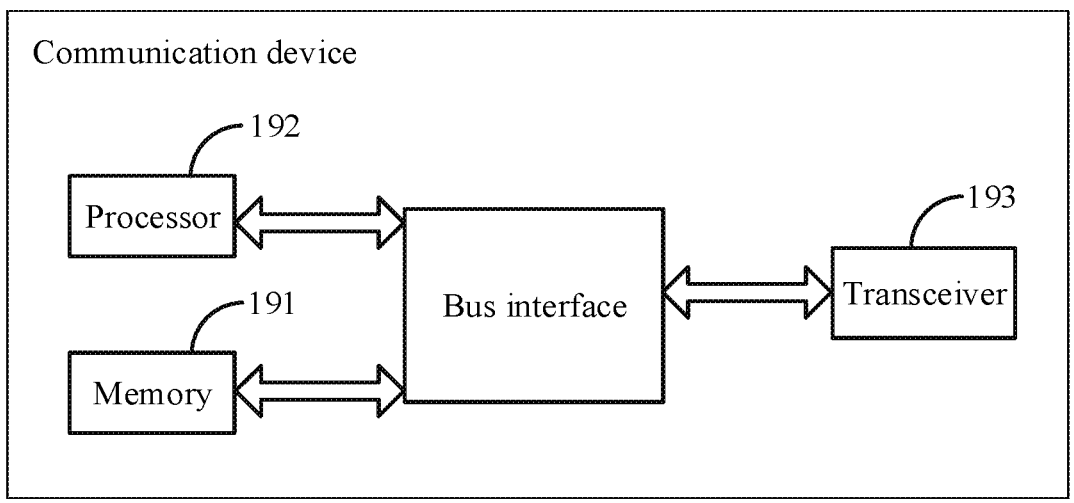
FIG. 19 is another schematic structural diagram of a communication device in embodiments of the disclosure.

Based on the same inventive concept, embodiments of the disclosure provide a communication device. The communication device may be, for example, the network device introduced in the above embodiment, as shown in FIG. 19. The communication device in embodiments of the disclosure includes a memory 191 and a processor 192. The memory 191 is configured to store a program instruction, and the processor 192 is configured to call the program instruction stored in the memory 191 to execute according to an obtained program:

when a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACK does not overlap with each other in the time domain, determining that the first UCI is dropped;

or when the first PUCCH carrying the first UCI overlaps, in the time domain, with a second PUCCH carrying a first HARQ-ACK, determining that the first UCI is dropped if it is determined that a third PUCCH carrying the first HARQ-ACK and the first UCI overlaps, in the time domain, with a fourth PUCCH carrying a second HARQ-ACK;

and the first UCI is of an type of UCI other than the HARQ-ACK, or when the first UCI includes the HARQ-ACK, a priority of the HARQ-ACK in the first UCI is lower than a priority of the HARQ-ACK carried on the second PUCCH.

In a possible implementation, according to the obtained program, the processor 192 executes: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped if it is determined that the plurality of HARQ-ACKs need to be transmitted simultaneously on a same PUCCH.

In a possible implementation, according to the obtained program, the processor 192 executes: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if it is determined that a PUCCH carrying both of the first HARQ-ACK and the first UCI overlaps, in the time domain, with a PUCCH carrying the second HARQ-ACK; and the first HARQ-ACK and the second HARQ-ACK are HARQ-ACKs carried on two different second PUCCHs among the plurality of second PUCCHs.

In a possible implementation, according to the obtained program, the processor 192 executes: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if a start position of the first PUCCH carrying the first UCI is earliest.

In a possible implementation, according to the obtained program, the processor 192 executes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if the first UCI is channel state information, CSI, and the HARQ-ACKs carried by the plurality of second PUCCHs are HARQ-ACKs of semi-static scheduling, SPS, physical downlink shared channel, PDSCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if the first UCI is CSI and the HARQ-ACKs carried by the plurality of second PUCCHs are not transmitted using any PUCCH format among PUCCH format 2 or 3 or 4.

In a possible implementation, according to the obtained program, the processor 192 executes:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if the first UCI is a scheduling request, SR, or a positive SR or the HARQ-ACK and the plurality of second PUCCHs use a PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determining that the first UCI is dropped, if the first UCI is an HARQ-ACK with more than 2 bits and the plurality of second PUCCHs use the PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, and the first UCI is the HARQ-ACK, determining that the first UCI is dropped if it is determined that the plurality of HARQ-ACKs need to be transmitted simultaneously on a same PUCCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, and the first UCI is the HARQ-ACK, determining that the first UCI is dropped if it is determined that the PUCCH carrying both of the first HARQ-ACK and the first UCI overlaps, in the time domain, with a PUCCH carrying the second HARQ-ACK, and the first HARQ-ACK and the second HARQ-ACK are the HARQ-ACKs carried on two different second PUCCHS among the plurality of second PUCCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, and the first UCI is the HARQ-ACK, determining that the first UCI is dropped if a start position of the first PUCCH carrying the first UCI is earliest.

A transceiver 193 is configured to receive and transmit data under control of the processor 192.

In FIG. 19, a bus interface may include any quantity of interconnected buses and bridges, which specifically link various circuits of one or more processors represented by the processor 192 and memories represented by the memory 191. A bus architecture may further link various other circuits of a peripheral device, a voltage stabilizer, a power management circuit, etc., which is well known in the art and therefore, will not be further described herein. The bus interface provides an interface. The transceiver 193 may be a plurality of elements, that is, including a transmitter and a receiver, providing a device for communicating with various other apparatuses on a transmission medium.

The processor 192 is in charge of managing the bus architecture and general processing, and the memory 191 may store data used by the processor 192 when executing an operation.

In one embodiment, the processor 192 may be a CPU, an ASIC, an FPGA or a CPLD, etc.

Figure 20:
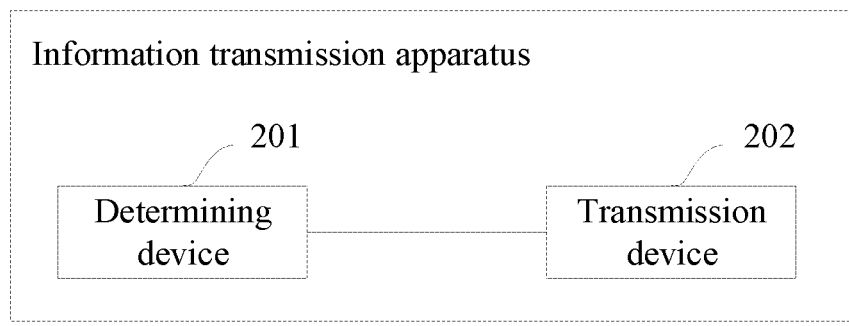
FIG. 20 is a structural block diagram of an information transmission apparatus in embodiments of the disclosure.

Based on the same inventive concept, embodiments of the disclosure provide an information transmission apparatus. The information transmission apparatus may be, for example, the terminal device introduced in the above embodiment. The information transmission apparatus may be realized by a chip system. The chip system may be composed of chips or include the chips or other discrete devices. Referring to FIG. 20, the information transmission apparatus in embodiments of the disclosure includes a determining device 201 and a transmission device 202.

The determining device 201 is configured to:

when a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACK does not overlap with each other in the time domain, drop the first UCI;

or when the first PUCCH carrying the first UCI overlaps, in the time domain, with a second PUCCH carrying a first HARQ-ACK, drop the first UCI, if it is determined that a third PUCCH carrying simultaneously the first HARQ-ACK and the first UCI overlaps, in the time domain, with a fourth PUCCH carrying a second HARQ-ACK;

and the first UCI is of an type of UCI other than the HARQ-ACK, or when the first UCI includes the HARQ-ACK, a priority of the HARQ-ACK in the first UCI is lower than a priority of the HARQ-ACK carried on the second PUCCH.

The transmission device 202 is configured to transmit data with other communication entities, for example, sending information such as the HARQ-ACK, the CSI, the SR, etc. to a network device.

In a possible implementation, the determining device 201 is configured to drop: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI, if it is determined that a plurality of HARQ-ACKS need to be transmitted simultaneously on the same PUCCH.

In a possible implementation, the determining device 201 is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI, if it is determined that a PUCCH carrying both of the first HARQ-ACK and the first UCI overlaps, in the time domain, with a PUCCH carrying the second HARQ-ACK, and the first HARQ-ACK and the second HARQ-ACK are HARQ-ACKs carried on two different second PUCCHs among the plurality of second PUCCHs.

In a possible implementation, the determining device 201 is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI if a start position of the first PUCCH carrying the first UCI is earliest.

In a possible implementation, the determining device 201 is configured to:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI if the first UCI is the CSI and the HARQ-ACKs carried by the plurality of second PUCCHs are HARQ-ACKs of corresponding SPS PDSCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI if the first UCI is the CSI and the HARQ-ACKs carried by the plurality of second PUCCHs are not transmitted using any PUCCH format among PUCCH format 2 or 3 or 4.

In a possible implementation, the determining device 201 is configured to:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI if the first UCI is the SR or a positive SR or the HARQ-ACK and the plurality of second PUCCHs use a PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, drop the first UCI if the first UCI is an HARQ-ACK with more than 2 bits and the plurality of second PUCCHs use the PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, drop the first UCI, if it is determined that the plurality of HARQ-ACKs need to be transmitted simultaneously on the same PUCCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, drop the first UCI, if it is determined that the PUCCH carrying both of the first HARQ-ACK and the first UCI overlaps, in the time domain, with the PUCCH carrying the second HARQ-ACK and the first HARQ-ACK and the second HARQ-ACK are the HARQ-ACKs carried on two different second PUCCHS among the plurality of second PUCCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, drop the first UCI if the start position of the first PUCCH carrying the first UCI is earliest.

All related contents of all steps executed by the terminal device mentioned in embodiments of the above information transmission method can be referred to for the function description of function modules to which the information transmission apparatus corresponds in embodiments of the disclosure, which will not be repeated here.

Figure 21:
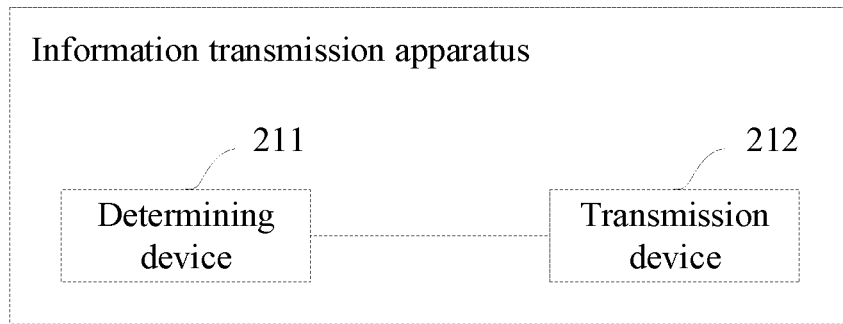
FIG. 21 is another structural block diagram of an information transmission apparatus in embodiments of the disclosure.

Based on the same inventive concept, embodiments of the disclosure provide an information transmission apparatus. The information transmission apparatus may be, for example, the network device introduced in the above embodiment. The information transmission apparatus may be realized by a chip system. The chip system may be composed of chips or include the chips and other discrete devices. Referring to FIG. 21, the information transmission apparatus in embodiments of the disclosure includes a determining device 211 and a transmission device 212.

The determining device 211 is configured to:

when a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACK does not overlap with each other in the time domain, determine that the first UCI is dropped;

or when the first PUCCH carrying the first UCI overlaps, in the time domain, with a second PUCCH carrying a first HARQ-ACK, determine that the first UCI is dropped if it is determined that a third PUCCH carrying the first HARQ-ACK and the first UCI overlaps, in the time domain, with a fourth PUCCH carrying a second HARQ-ACK;

and the first UCI is of an type of UCI other than the HARQ-ACK, or when the first UCI includes the HARQ-ACK, a priority of the HARQ-ACK in the first UCI is lower than a priority of the HARQ-ACK carried on the second PUCCH.

The transmission device 212 is configured to transmit data with other communication entities, for example, receiving information such as the HARQ-ACK, the CSI, the SR, etc. sent by a terminal device.

In a possible implementation, the determining device 211 is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if it is determined that a plurality of HARQ-ACKs need to be transmitted simultaneously on the same PUCCH.

In a possible implementation, the determining device 211 is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if it is determined that a PUCCH carrying both of the first HARQ-ACK and the first UCI overlaps, in the time domain, with a PUCCH carrying the second HARQ-ACK; and the first HARQ-ACK and the second HARQ-ACK are HARQ-ACKs carried on two different second PUCCHs among the plurality of second PUCCHs.

In a possible implementation, the determining device 211 is configured to: when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if a start position of the first PUCCH carrying the first UCI is earliest.

In a possible implementation, the determining device 211 is configured to:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if the first UCI is the CSI and the HARQ-ACKs carried by the plurality of second PUCCHs are HARQ-ACKs of SPS PDSCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if the first UCI is the CSI and the HARQ-ACKs carried by the plurality of second PUCCHs are not transmitted using any PUCCH format among PUCCH format 2 or 3 or 4.

In a possible implementation, the determining device 211 is configured to:

when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if the first UCI is the SR or a positive SR or the HARQ-ACK and the plurality of second PUCCHs use a PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain, determine that the first UCI is dropped if the first UCI is an HARQ-ACK with more than 2 bits and the plurality of second PUCCHs use the PUCCH format 1 for transmitting the HARQ-ACKs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, determine that the first UCI is dropped if it is determined that the plurality of HARQ-ACKs need to be transmitted simultaneously on the same PUCCH; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, determine that the first UCI is dropped if it is determined that the PUCCH carrying both of the first HARQ-ACK and the first UCI overlaps, in the time domain, with the PUCCH carrying the second HARQ-ACK, and the first HARQ-ACK and the second HARQ-ACK are the HARQ-ACKs carried on two different second PUCCHS among the plurality of second PUCCHs; or when the first PUCCH carrying the first UCI overlaps, in the time domain, with each of the plurality of second PUCCHs carrying the HARQ-ACKs and each of the plurality of second PUCCHs carrying HARQ-ACK does not overlap with each other in the time domain and the first UCI is the HARQ-ACK, determine that the first UCI is dropped if the start position of the first PUCCH carrying the first UCI is earliest.

All related contents of all steps executed by the network device mentioned in embodiments of the above information transmission method can be referred to for the function description of function modules to which the information transmission apparatus corresponds in embodiments of the disclosure, which will not be repeated here.

Dividing of the devices in embodiments of the disclosure is exemplary as only logic function dividing, and other dividing modes are allowed in actual implementation. Besides, all function devices in all embodiments of the disclosure can be integrated into a processor or serve as an independent physical existence, or two or more devices can be integrated into one module. The integrated devices can be realized in a form of hardware or a form of software function device.

The integrated devices can be stored in a computer readable storage medium when being realized in the form of software function device and sold or used as an independent product. Based on this understanding, the embodiments of the disclosure essentially or part of them making contributions to the prior art or all of or part of the embodiments may be embodied in a form of a software product. A computer software product is stored in a storage medium, including a plurality of instructions for enabling a computer device (may be a personal computer, a server or a network device, etc.) or a processor to execute all of or part of steps of the method of all embodiments of the disclosure. The above storage medium includes: a USB flash disk, a mobile hard disk drive, a read-only memory (ROM), a random access memory (RAM), a diskette or a compact disc and other various media capable of storing a program code.

Embodiments of the disclosure provide a computing device. The computing device may be, specifically, a desktop computer, a portable computer, a smart phone, a tablet computer, a personal digital assistant (PDA), etc. The computing device may include a center processing unit (CPU), a memory, an input/output device, etc. The input device may include a keyboard, a mouse, a touch screen, etc. The output device may include a display device, such as a liquid crystal display (LCD), a cathode ray tube (CRT), etc.

The memory may include a read-only memory (ROM) and a random access memory (RAM) and provides a program instruction and data stored in the memory for the processor. In embodiments of the disclosure, the memory may be configured to store a program of any method provided by embodiments of the disclosure.

The processor calls the program instruction stored in the memory to execute any method provided by embodiments of the disclosure according to the obtained program instruction.

The computer storage medium may be any available medium or data storage device which the computer can access, including but not limited to a magnetic memory (for example, a floppy disk, a hard disc, a magnetic tape, a magnetic optical disc (MO), etc.), an optical memory (for example, CD, DVD, BD, HVD, etc.), and a semi-conductor memory (for example, ROM, EPROM, EEPROM, a non-volatile memory (NAND FLASH), a solid state disk (SSD)), etc.

A processing flow of the above method may be realized through a software program. The software program may be stored in a storage medium. When the stored software program is called, the steps of the above method are executed.

Based on the same inventive concept, embodiments of the disclosure further provide a computer readable storage medium. The computer readable storage medium stores a computer instruction. When the computer instruction runs on a computer, the computer is enabled to execute steps of the above information transmission method.

Based on the inventive concept, embodiments of the disclosure further provide a chip system. The chip system includes a processor and also includes a memory for realizing steps of the above information transmission method. The chip system may be composed of chips or include the chips and other discrete devices.

In some possible implementations, all aspects of the information transmission method provided by embodiments of the disclosure may be also realized in a form of a software product, which includes a program code. When the program product runs on a computer, the program code is used for enabling the computer to execute steps of the information transmission method described above according to various exemplary implementations of the disclosure.

Embodiments of the disclosure may be provided as a method, a system, or a computer program product. Therefore, the disclosure may use a complete hardware embodiment, a complete software embodiment or a form of a software and hardware combined embodiment. Besides, the disclosure can use a form of a computer program product implemented on one or more computer available storage media (including but not limited to a magnetic disk memory, CD-ROM, an optical memory, etc.) in which computer available program codes are contained.

The disclosure is described with reference to flowcharts and/or block diagrams of a method, a device (system) and a computer program product according to embodiments of the disclosure. It should be understood that each flow and/or block in the flowcharts and/or block diagrams and a combination of the flows and/or the blocks in the flowcharts and/or block diagrams can be realized through computer program instructions. These computer program instructions may be provided for a general-purpose computer, a special-purpose computer, an embedded processor or processors of other programmable data processing devices to generate a machine, and an apparatus is generated for realizing specified functions in one or more flows in the flowcharts and/or one or more blocks in the block diagrams through the instructions executed by the computer or the processors of the other programmable data processing devices.

These computer program instructions may be also stored in a computer readable memory which can guide the computer or other programmable data processing devices to work in a specific mode, and the instructions stored in the computer readable memory can generate a product including an instruction apparatus. The instruction apparatus realizes the specified functions in one or more flows in the flowcharts and/or one or more blocks in the block diagrams.

These computer program instructions may be also loaded onto the computer or the other programmable data processing devices, and a series of operation steps are executed on the computer or the other programmable devices to generate processing realized by the computer, and thus the instructions executed on the computer or the other programmable devices provide steps for realizing the specified functions in one or more flows in the flowcharts and/or one or more blocks in the block diagrams.

The invention claimed is:

1. An information transmission method, comprising:
based on that a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACKs does not overlap with each other in the time domain, dropping, by a terminal device, the first UCI;
or
based on that the first PUCCH carrying the first UCI overlaps, in the time domain, with a second PUCCH carrying a first HARQ-ACK, dropping, by the terminal device, the first UCI, if it is determined that a third PUCCH carrying simultaneously the first HARQ-ACK and the first UCI overlaps, in the time domain, with a fourth PUCCH carrying a second HARQ-ACK;
wherein the first UCI is of a type of UCI other than the HARQ-ACK, or when the first UCI comprises the HARQ-ACK, a priority of the HARQ-ACK in the first UCI is lower than a priority of the HARQ-ACK carried on the second PUCCH.

2. The method according to claim 1, wherein based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the method further comprises at least one of:
determining that the plurality of HARQ-ACKs need to be transmitted simultaneously on a same PUCCH;
determining that a PUCCH carrying simultaneously a first HARQ-ACK and the first UCI overlaps, in the time domain, with a PUCCH carrying a second HARQ-ACK; wherein the first HARQ-ACK and the second HARQ-ACK are HARQ-ACKs carried on two different second PUCCHs among the plurality of second PUCCHs; or
determining that a start position of the first PUCCH carrying the first UCI is earliest.

3. The method according to claim 1, wherein based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the method further comprises:
determining that the first UCI is channel state information, CSI, and the HARQ-ACKs carried by the plurality of second PUCCHs are HARQ-ACKs of semi-static scheduling, SPS, physical downlink shared channel, PDSCH; or determining that the first UCI is the CSI and the HARQ-ACKs carried by the plurality of second PUCCHs are not transmitted using any PUCCH format among PUCCH format 2 or 3 or 4.

4. The method according to claim 1, wherein based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the method further comprises:

determining that the first UCI is an SR or a positive SR or the HARQ-ACK and the plurality of second PUCCHs use a PUCCH format 1 for transmitting the HARQ-ACKs; or determining that the first UCI is an HARQ-ACK with more than 2 bits and the plurality of second PUCCHs use the PUCCH format 1 for transmitting the HARQ-ACKs; or the first UCI is the HARQ-ACK, and based on further determining that the HARQ-ACKs need to be transmitted simultaneously on a same PUCCH, dropping, by the terminal device, the first UCI; or the first UCI is the HARQ-ACK, and determining that the PUCCH carrying both of the first HARQ-ACK and the first UCI overlaps, in the time domain, with a PUCCH carrying the second HARQ-ACK, wherein the first HARQ-ACK and the second HARQ-ACK are HARQ-ACKs carried on two different second PUCCHS among the plurality of second PUCCHs; or the first UCI is the HARQ-ACK, and determining that a start position of the first PUCCH carrying the first UCI is earliest.

5. The method according to claim 1, wherein the first UCI comprises any one or a combination of the following:
periodic channel state information, CSI; or
a scheduling request, SR.

6. An information transmission method, comprising:
based on that a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACKs does not overlap with each other in the time domain, determining, by a network device, that the first UCI is dropped;
or
based on that the first PUCCH carrying the first UCI overlaps, in the time domain, with a second PUCCH carrying a first HARQ-ACK, determining, by the network device, that the first UCI is dropped if it is determined that a third PUCCH carrying the first HARQ-ACK and the first UCI overlaps, in the time domain, with a fourth PUCCH carrying a second HARQ-ACK;
wherein the first UCI is of a type of UCI other than the HARQ-ACK, or when the first UCI comprises the HARQ-ACK, a priority of the HARQ-ACK in the first UCI is lower than a priority of the HARQ-ACK carried on the second PUCCH.

7. The method according to claim 6, wherein based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the method further comprises at least one of:

determining that the plurality of HARQ-ACKs need to be transmitted simultaneously on a same PUCCH;

determining that a PUCCH carrying both of the first HARQ-ACK and the first UCI overlaps, in the time domain, with a PUCCH carrying the second HARQ-ACK; wherein the first HARQ-ACK and the second HARQ-ACK are HARQ-ACKs carried on two different second PUCCHs among the plurality of second PUCCHs; or determining that a start position of the first PUCCH carrying the first UCI is earliest.

8. The method according to claim 6, wherein based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the method further comprises:

determining that the first UCI is channel state information, CSI, and the HARQ-ACKs carried by the plurality of second PUCCHs are HARQ-ACKs of semi-static scheduling, SPS, physical downlink shared channel, PDSCH; or determining that the first UCI is CSI and the HARQ-ACKs carried by the plurality of second PUCCHs are not transmitted using any PUCCH format among PUCCH format 2 or 3 or 4.

9. The method according to claim 6, wherein based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the method further comprises:

determining that the first UCI is a scheduling request, SR, or a positive SR or the HARQ-ACK and the plurality of second PUCCHs use a PUCCH format 1 for transmitting the HARQ-ACKs; or determining that the first UCI is an HARQ-ACK with more than 2 bits and the plurality of second PUCCHs use the PUCCH format 1 for transmitting the HARQ-ACKs; or the first UCI is the HARQ-ACK, and determining that the plurality of HARQ-ACKs need to be transmitted simultaneously on a same PUCCH; or the first UCI is the HARQ-ACK, and determining that the PUCCH carrying both of the first HARQ-ACK and the first UCI overlaps, in the time domain, with a PUCCH carrying the second HARQ-ACK, wherein the first HARQ-ACK and the second HARQ-ACK are the HARQ-ACKs carried on two different second PUCCHS among the plurality of second PUCCHs; or the first UCI is the HARQ-ACK, and determining that a start position of the first PUCCH carrying the first UCI is earliest.

10. The method according to claim 6, wherein the first UCI comprises any one or a combination of the following:
periodic channel state information, CSI; or
a scheduling request, SR.

11. A communication device, comprising:
a memory, configured to store a program instruction; and
a processor, configured to call the program instruction stored in the memory to execute a method of claim 6 according to an obtained program.

12. The communication device according to claim 11, wherein according to the obtained program, based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the processor is further configured to execute at least one of:
determining that the plurality of HARQ-ACKs need to be transmitted simultaneously on a same PUCCH;
based on further determining that a PUCCH carrying both of the first HARQ-ACK and the first UCI overlaps, in the time domain, with a PUCCH carrying the second HARQ-ACK; wherein the first HARQ-ACK and the second HARQ-ACK are HARQ-ACKs carried on two different second PUCCHs among the plurality of second PUCCHs; or
determining that a start position of the first PUCCH carrying the first UCI is earliest.

13. The communication device according to claim 11, wherein according to the obtained program, based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the processor is further configured to execute:
determining that the first UCI is channel state information, CSI, and the HARQ-ACKs carried by the plurality of second PUCCHs are HARQ-ACKs of semi-static scheduling, SPS, physical downlink shared channel, PDSCH; or
determining that the first UCI is CSI and the HARQ-ACKs carried by the plurality of second PUCCHs are not transmitted using any PUCCH format among PUCCH format 2 or 3 or 4.

14. The communication device according to claim 11, wherein according to the obtained program, based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the processor is further configured to execute:
determining that the first UCI is a scheduling request, SR, or a positive SR or the HARQ-ACK and the plurality of second PUCCHs use a PUCCH format 1 for transmitting the HARQ-ACKs; or
determining that the first UCI is an HARQ-ACK with more than 2 bits and the plurality of second PUCCHs use the PUCCH format 1 for transmitting the HARQ-ACKs; or
the first UCI is the HARQ-ACK, and determining that the plurality of HARQ-ACKs need to be transmitted simultaneously on a same PUCCH; or
the first UCI is the HARQ-ACK, and determining that the PUCCH carrying both of the first HARQ-ACK and the first UCI overlaps, in the time domain, with a PUCCH carrying the second HARQ-ACK, wherein the first HARQ-ACK and the second HARQ-ACK are the HARQ-ACKs carried on two different second PUCCHS among the plurality of second PUCCHs; or
the first UCI is the HARQ-ACK, and determining that a start position of the first PUCCH carrying the first UCI is earliest.

15. The communication device according to claim 11, wherein the first UCI comprises any one or a combination of the following:
periodic channel state information, CSI; or
a scheduling request, SR.

16. A communication device, comprising:
a memory, configured to store a program instruction; and
a processor, configured to call the program instruction stored in the memory to execute according to an obtained program:
based on that a first physical uplink control channel, PUCCH, carrying a first uplink control information, UCI, overlaps, in a time domain, with each of a plurality of second PUCCHs carrying hybrid automatic repeat request-acknowledgements, HARQ-ACKs, and each of the plurality of second PUCCHs carrying HARQ-ACKs does not overlap with each other in the time domain, dropping the first UCI;
or
based on that the first PUCCH carrying the first UCI overlaps, in the time domain, with a second PUCCH carrying a first HARQ-ACK, dropping the first UCI, if it is determined that a third PUCCH carrying simultaneously the first HARQ-ACK and the first UCI overlaps, in the time domain, with a fourth PUCCH carrying a second HARQ-ACK;
wherein the first UCI is of a type of UCI other than the HARQ-ACK, or when the first UCI comprises the HARQ-ACK, a priority of the HARQ-ACK in the first UCI is lower than a priority of the HARQ-ACK carried on the second PUCCH.

17. The communication device according to claim 16, wherein according to the obtained program, based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the processor is further configured to execute at least one of:
determining that the plurality of HARQ-ACKs need to be transmitted simultaneously on a same PUCCH;
determining that a PUCCH carrying simultaneously a first HARQ-ACK and the first UCI overlaps, in the time domain, with a PUCCH carrying a second HARQ-ACK; wherein the first HARQ-ACK and the second HARQ-ACK are HARQ-ACKs carried on two different second PUCCHs among the plurality of second PUCCHs; or
determining that a start position of the first PUCCH carrying the first UCI is earliest.

18. The communication device according to claim 16, wherein according to the obtained program, based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the processor is further configured to execute:
determining that the first UCI is channel state information, CSI, and the HARQ-ACKs carried by the plurality of second PUCCHs are HARQ-ACKs of semi-static scheduling, SPS, physical downlink shared channel, PDSCH; or
determining that the first UCI is the CSI and the HARQ-ACKs carried by the plurality of second PUCCHs are not transmitted using any PUCCH format among PUCCH format 2 or 3 or 4.

19. The communication device according to claim 16, wherein according to the obtained program, based on that the first PUCCH carrying the first UCI overlaps, in the time domain, with each of the plurality of second PUCCHs carrying the HARQ-ACKs and each of the plurality of second PUCCHs carrying HARQ-ACKs does not overlap with each other in the time domain, the processor is further configured to execute:

determining that the first UCI is an SR or a positive SR or the HARQ-ACK and the plurality of second PUCCHs use a PUCCH format 1 for transmitting the HARQ-ACKs; or determining that the first UCI is an HARQ-ACK with more than 2 bits and the plurality of second PUCCHs use the PUCCH format 1 for transmitting the HARQ-ACKs; or the first UCI is the HARQ-ACK, and determining that the plurality of HARQ-ACKs need to be transmitted simultaneously on a same PUCCH; or the first UCI is the HARQ-ACK, and determining that the PUCCH carrying both of the first HARQ-ACK and the first UCI overlaps, in the time domain, with a PUCCH carrying the second HARQ-ACK, wherein the first HARQ-ACK and the second HARQ-ACK are HARQ-ACKs carried on two different second PUCCHS among the plurality of second PUCCHs; or the first UCI is the HARQ-ACK, and determining that a start position of the first PUCCH carrying the first UCI is earliest.

20. The communication device according to claim 16, wherein the first UCI comprises any one or a combination of the following:

periodic channel state information, CSI; or a scheduling request, SR.

\* \* \* \* \*